United States Patent
Rudolf et al.

(10) Patent No.: US 12,513,623 B2
(45) Date of Patent: Dec. 30, 2025

(54) TRANSMISSION AND RECEPTION POWER IN FULL-DUPLEX SYSTEMS

(71) Applicant: Samsung Electronics Co., Ltd., Suwon-si (KR)

(72) Inventors: Marian Rudolf, Longueuil (CA); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/191,684

(22) Filed: Mar. 28, 2023

(65) Prior Publication Data

US 2023/0328656 A1    Oct. 12, 2023

Related U.S. Application Data

(60) Provisional application No. 63/329,711, filed on Apr. 11, 2022, provisional application No. 63/329,179, filed on Apr. 8, 2022.

(51) Int. Cl.
*H04W 52/14* (2009.01)
*H04W 52/24* (2009.01)
*H04W 72/14* (2009.01)

(52) U.S. Cl.
CPC ......... *H04W 52/143* (2013.01); *H04W 52/24* (2013.01)

(58) Field of Classification Search
None
See application file for complete search history.

(56) References Cited

U.S. PATENT DOCUMENTS

| | | | |
|---|---|---|---|
| 10,016,032 B1 * | 7/2018 | Menn | A61H 3/0288 |
| 10,966,283 B2 * | 3/2021 | Xiong | H04L 5/0051 |
| 11,166,238 B2 * | 11/2021 | Jiang | H04W 24/10 |
| 11,310,088 B2 * | 4/2022 | Ly | H04L 5/0023 |
| 11,540,228 B2 * | 12/2022 | Abotabl | H04W 74/0833 |
| 11,611,939 B2 * | 3/2023 | Davydov | H04W 52/36 |
| 11,664,960 B2 * | 5/2023 | Huang | H04W 72/0446 |
| | | | 370/329 |
| 11,696,240 B2 * | 7/2023 | Wilson | H04W 52/146 |
| | | | 370/280 |

(Continued)

OTHER PUBLICATIONS

International Search Report and Written Opinion issued Jul. 12, 2023, regarding International Application No. PCT/KR2023/004705, 9 pages.

(Continued)

*Primary Examiner* — Tuan A Tran

(57) ABSTRACT

Apparatuses and methods for transmission power in full-duplex systems. A method of operating a user equipment (UE) for receiving a downlink (DL) channel or signal includes receiving first information for a first set of parameters for a first DL channel or signal associated with a first subset of slots from a set of slots on a cell and second information for a second set of parameters for a second DL channel or signal associated with a second subset of slots from the set of slots on the cell. The method further includes determining, based on a slot for a reception being from the second subset of slots, to use the second set of parameters for the reception and receiving, based on a power adjustment value in the second set of parameters, the second DL channel or signal in the slot.

11 Claims, 16 Drawing Sheets

(56) References Cited

U.S. PATENT DOCUMENTS

| | | | | |
|---|---|---|---|---|
| 11,700,073 | B2* | 7/2023 | Ibrahim | H04J 11/005 |
| | | | | 370/252 |
| 11,716,745 | B1* | 8/2023 | Mansour | H04W 72/1268 |
| | | | | 370/329 |
| 11,792,786 | B2* | 10/2023 | Sridharan | H04L 1/08 |
| | | | | 370/329 |
| 11,864,219 | B2* | 1/2024 | Zhang | H04W 72/541 |
| 11,910,326 | B2* | 2/2024 | Burke | H04B 1/525 |
| 11,917,668 | B2* | 2/2024 | Ibrahim | H04W 72/541 |
| 11,924,772 | B2* | 3/2024 | Liu | H04W 52/146 |
| 11,929,959 | B2* | 3/2024 | Abotabl | H04W 72/23 |
| 11,973,722 | B2* | 4/2024 | Abotabl | H04W 52/0216 |
| 11,974,309 | B2* | 4/2024 | Abotabl | H04L 5/0082 |
| 11,979,259 | B2* | 5/2024 | Ly | H04L 5/0051 |
| 11,991,702 | B2* | 5/2024 | Yu | H04W 72/21 |
| 12,021,622 | B2* | 6/2024 | Abotabl | H04L 5/003 |
| 12,127,025 | B2* | 10/2024 | Ibrahim | H04W 24/08 |
| 12,133,172 | B2* | 10/2024 | Ryu | H04L 5/14 |
| 12,184,398 | B2* | 12/2024 | Ibrahim | H04J 11/0053 |
| 12,225,397 | B2* | 2/2025 | Shin | H04W 4/46 |
| 12,335,819 | B2* | 6/2025 | Fehrenbach | H04W 4/44 |
| 2011/0268204 | A1* | 11/2011 | Choi | H04B 7/0478 |
| | | | | 375/296 |
| 2018/0124708 | A1 | 5/2018 | Davydov et al. | |
| 2020/0374807 | A1 | 11/2020 | Zhang | |
| 2021/0203469 | A1 | 7/2021 | Abedini et al. | |
| 2021/0273774 | A1 | 9/2021 | Abotabl et al. | |
| 2021/0297226 | A1 | 9/2021 | Abotabl et al. | |
| 2022/0123865 | A1* | 4/2022 | Sridharan | H04L 5/0053 |
| 2022/0386242 | A1* | 12/2022 | Abotabl | H04W 72/1268 |
| 2023/0171072 | A1* | 6/2023 | Ibrahim | H04L 5/0048 |
| | | | | 370/329 |

OTHER PUBLICATIONS

"3rd Generation Partnership Project; Technical Specification Group Radio Access Network; Evolved Universal Terrestrial Radio Access (E-UTRA); Physical layer procedures (Release 17)", 3GPP TS 36.213 V17.1.0, section 5.2, Mar. 2022, pp. 57-60.

Ericsson, "Higher-layer signaling for NAICS", 3GPP TSG-RAN WG1#77, R1-142320, May 2014, 4 pages.

"3rd Generation Partnership Project; Technical Specification Group Radio Access Network; NR; Physical channels and modulation (Release 17)", 3GPP TS 38.211 V17.0.0, Dec. 2021, 134 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer procedures for control (Release 17)", 3GPP TS 38.213 V17.0.0, Dec. 2021, 225 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"5G; NR; User Equipment (UE) radio transmission and reception; Part 1: Range 1 Standalone (3GPP TS 38.101-1 version 16.6.0 Release 16)", ETSI TS 138 101-1 V16.6.0, Jan. 2021, 447 pages.

"5G; NR; User Equipment (UE) radio transmission and reception; Part 2: Range 2 Standalone (3GPP TS 38.101-2 version 16.9.0 Release 16)", ETSI TS 138 101-2 V16.9.0, Oct. 2021, 175 pages.

"5G; NR; User Equipment (UE) radio transmission and reception; Part 3: Range 1 and Range 2 Interworking operation with other radios (3GPP TS 38.101-3 version 16.9.0 Release 16)", ETSI TS 138 101-3 V16.9.0, Oct. 2021, 541 pages.

"5G; NR; Requirements for support of radio resource management (3GPP TS 38.133 version 16.8.0 Release 16)", ETSI TS 138 133 V16.8.0, Sep. 2021, 2886 pages.

Extended European Search Report issued Mar. 11, 2025 regarding Application No. 23785040.9, 9 pages.

* cited by examiner

TRANSMISSION AND RECEPTION POWER IN FULL-DUPLEX SYSTEMS

CROSS-REFERENCE TO RELATED APPLICATION AND CLAIM OF PRIORITY

This application claims priority under 35 U.S.C. § 119(e) to U.S. Provisional Patent Application No. 63/329,179 filed on Apr. 8, 2022 and U.S. Provisional Patent Application No. 63/329,711 filed on Apr. 11, 2022. The above-identified provisional patent applications are hereby incorporated by reference in their entirety.

TECHNICAL FIELD

The present disclosure relates generally to wireless communication systems and, more specifically, to transmission and reception power in full-duplex systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for supporting transmission and reception power in full-duplex systems.

In one embodiment, a method of operating a user equipment (UE) for receiving a downlink (DL) channel or signal is provided. The method includes receiving first information for a first set of parameters for a first DL channel or signal associated with a first subset of slots from a set of slots on a cell and receiving second information for a second set of parameters for a second DL channel or signal associated with a second subset of slots from the set of slots on the cell. The method further includes determining, based on a slot for a reception being from the second subset of slots, to use the second set of parameters for the reception and receiving, based on a power adjustment value in the second set of parameters, the second DL channel or signal in the slot. Slots from the first subset of slots do not include time-domain resources indicated for simultaneous transmission and reception on the cell. Slots from the second subset of slots include time-domain resources indicated for simultaneous transmission and reception on the cell.

In another embodiment, a UE is provided. The UE comprises a transceiver configured to receive first information for a first set of parameters for a first DL channel or signal associated with a first subset of slots from a set of slots on a cell and receive second information for a second set of parameters for a second DL channel or signal associated with a second subset of slots from the set of slots on the cell. The UE further includes a processor operably coupled to the transceiver. The processor is configured to determine, based on a slot for a reception being from the second subset of slots, to use the second set of parameters for the reception. The transceiver is further configured to receive, based on a power adjustment value in the second set of parameters, the second DL channel or signal in the slot. Slots from the first subset of slots do not include time-domain resources indicated for simultaneous transmission and reception on the cell. Slots from the second subset of slots include time-domain resources indicated for simultaneous transmission and reception on the cell.

In yet another embodiment, a base station (BS) is provided. The BS includes a transceiver configured to transmit first information for a first set of parameters for a first DL channel or signal associated with a first subset of slots from a set of slots on a cell and transmit second information for a second set of parameters for a second DL channel or signal associated with a second subset of slots from the set of slots on the cell. The BS further includes a processor operably coupled to the transceiver, the processor configured to determine, based on a slot for a transmission being from the second subset of slots, to transmit according to the second set of parameters. The transceiver is further configured to transmit, based on a power adjustment value in the second set of parameters, the second DL channel or signal in the slot. Slots from the first subset of slots do not include time-domain resources indicated for simultaneous transmission and reception on the cell. Slots from the second subset of slots include time-domain resources indicated for simultaneous transmission and reception on the cell.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
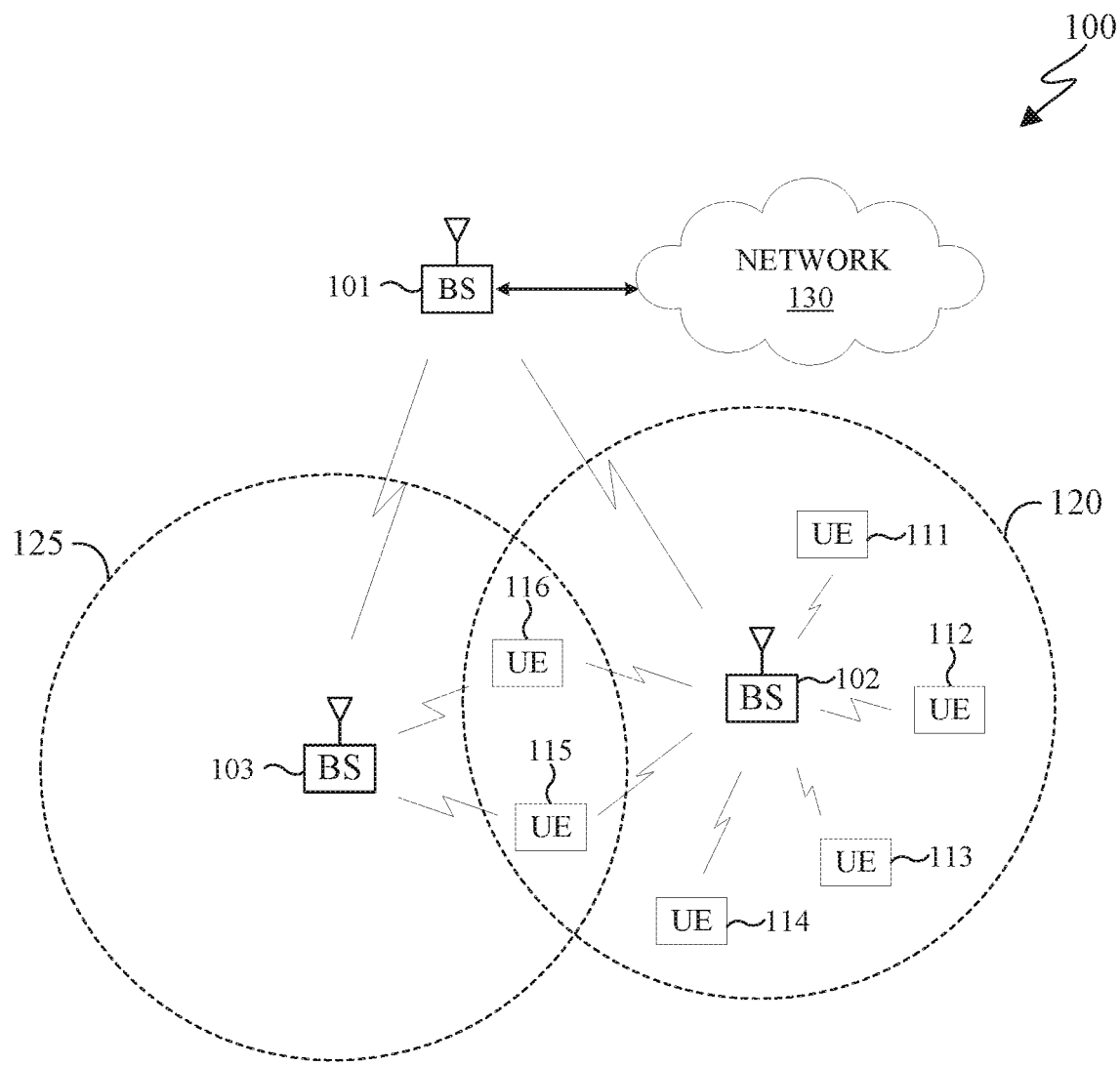
FIG. 1 illustrates an example wireless network according to embodiments of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.0.0, "NR, Physical channels and modulation" (herein "REF 1"); 3GPP TS 38.212 v17.0.0, "NR, Multiplexing and Channel coding" (herein "REF 2"); 3GPP TS 38.213 v17.0.0, "NR, Physical Layer Procedures for Control" (herein "REF 3"); 3GPP TS 38.214 v17.0.0, "NR, Physical Layer Procedures for Data" (herein "REF 4"); 3GPP TS 38.321 v16.5.0, "NR, Medium Access Control (MAC) protocol specification" (herein "REF 5"); 3GPP TS 38.331 v16.5.0, "NR, Radio Resource Control (RRC) Protocol Specification (herein "REF 6"), 3GPP TS 38.101-1/-2/-3 v.16.6.0/16.9.0/16.9.0, "NR; UE radio transmission and reception; Part 1: Range 1 Standalone/Part 2: Range 2 Standalone/Part 3: Range 1 and Range 2 Interworking operation with other radios" (herein "REF 7"), and 3GPP TS 38.133 v16.8.0, "NR; Requirements for support of radio resource management" (herein "REF 8").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
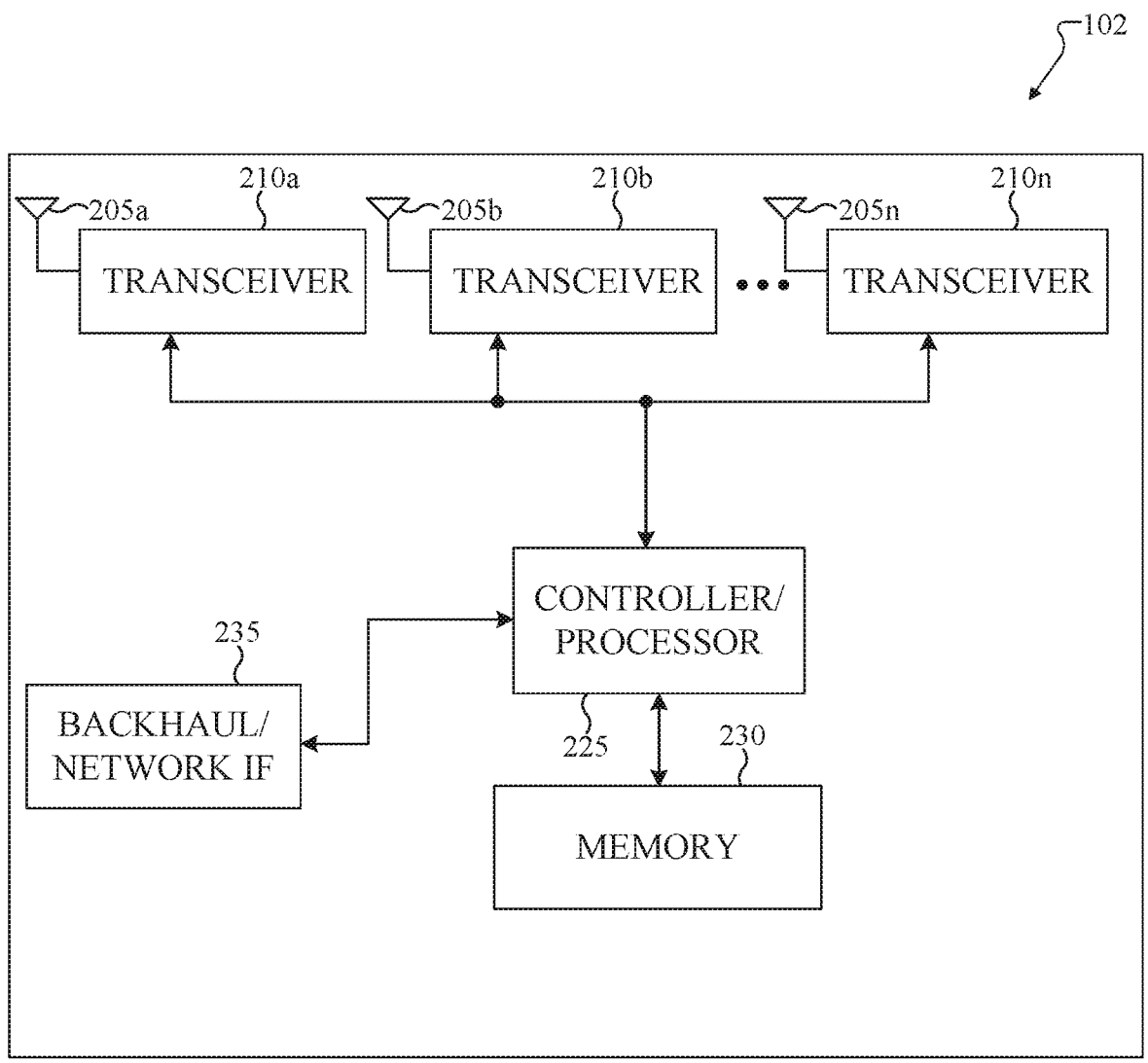
FIG. 2 illustrates an example gNodeB (gNB) according to embodiments of the present disclosure.
Figure 3:
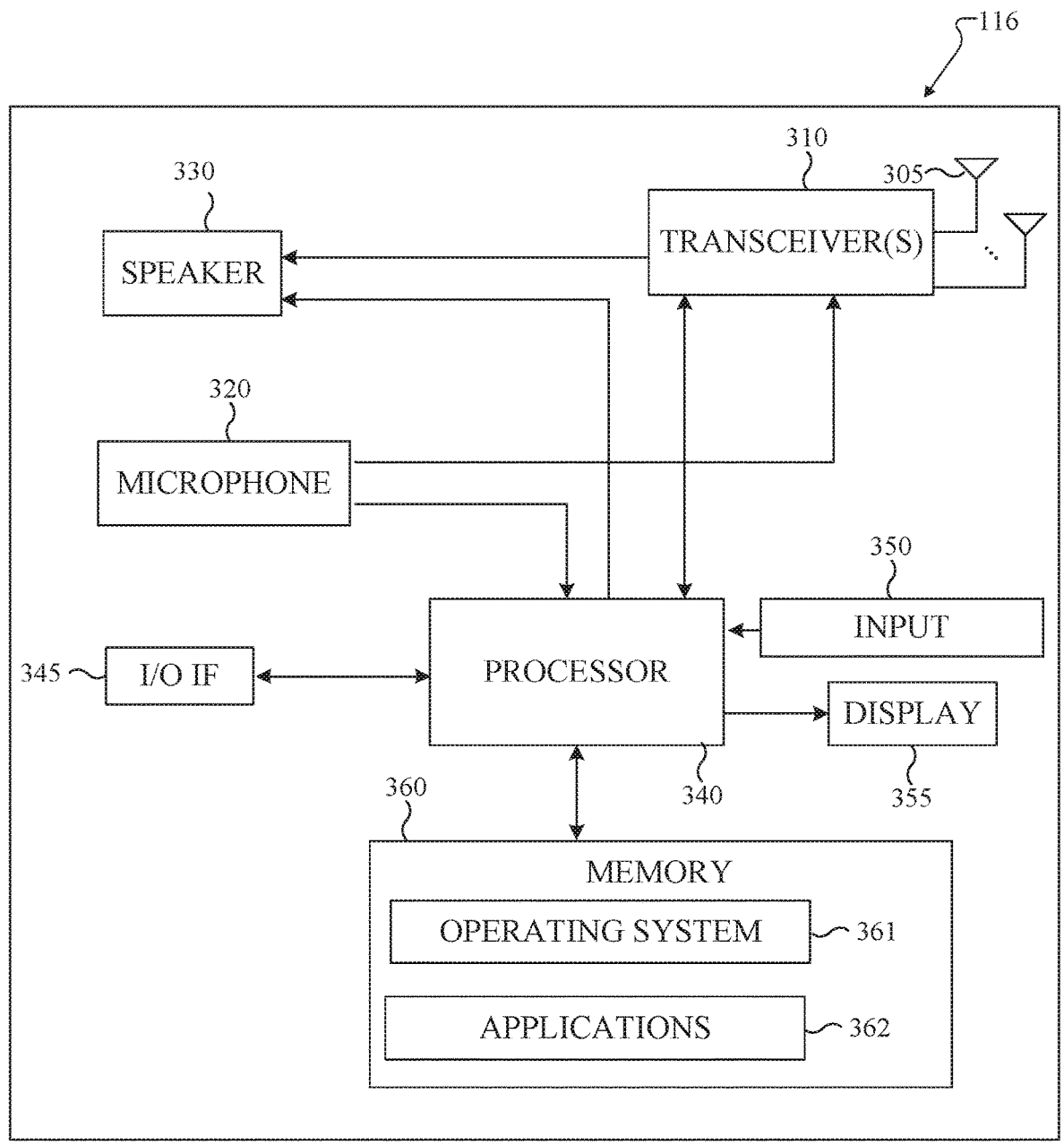
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting reception power in full-duplex systems. In certain embodiments, one or more of the BSs 101-103 include circuitry, programing, or a combination thereof for supporting transmission power in full-duplex systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting transmission power in full-duplex systems. Any of a wide variety of other functions could be supported in the gNB 102 by the controller/processor 225.

The controller/processor 225 is also capable of executing programs and other processes resident in the memory 230, such as processes for supporting transmission power in full-duplex systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for supporting reception power in full-duplex systems. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 1 millisecond or 0.5 millisecond, include 14 symbols and an RB can include 12 SCs with inter-SC spacing of 15 kHz or 30 kHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a PUSCH transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
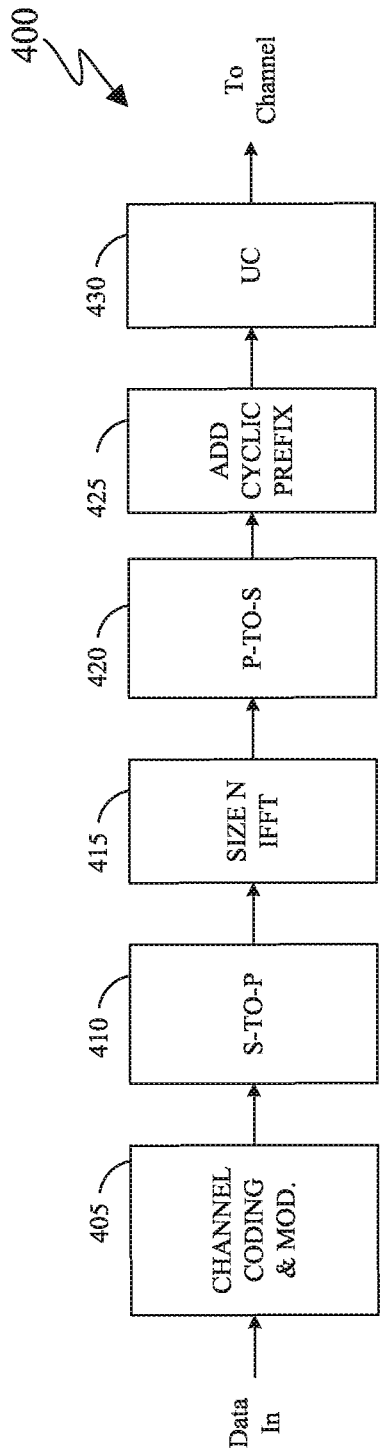
FIGS. 4 and 5 illustrate example wireless transmit and receive paths according to embodiments of the present disclosure.
Figure 5:
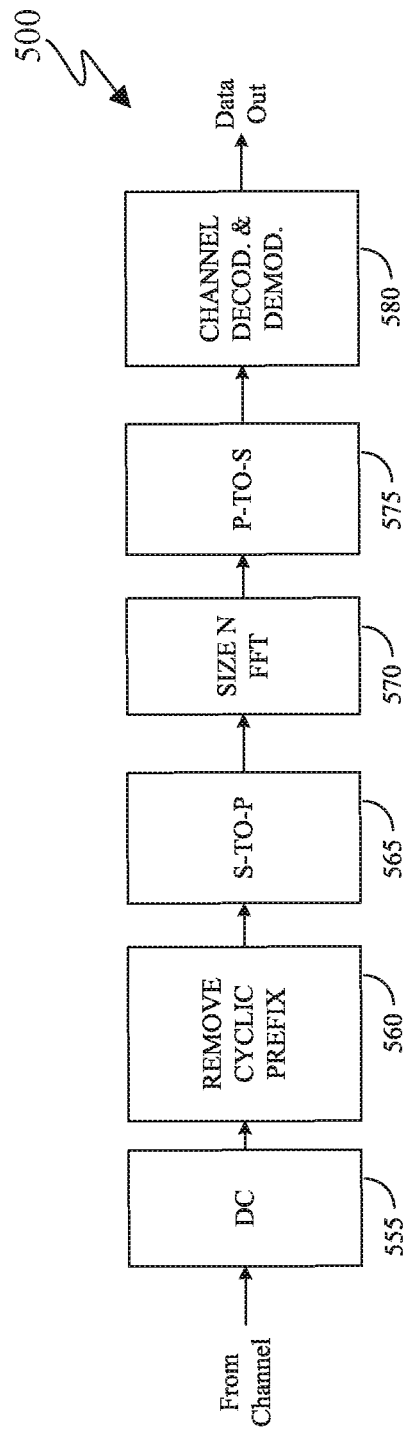

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support transmission power in full-duplex systems as described in embodiments of the present disclosure. In other embodiments, the receive path 500 is configured to support reception power in full-duplex systems as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also NR specification). A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an active UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission because of channel reciprocity. Additionally, in order to establish synchronization or an initial higher layer connection with a gNB, a UE can transmit a physical random access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same physical resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SSBs transmitted with the same block index on the same center frequency location are quasi co-located with respect to Doppler spread, Doppler shift, average gain, average delay, delay spread, and, when applicable, spatial Rx parameters. The UE may not assume quasi co-location for any other SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DMRS ports associated with a PDSCH are QCL with QCL type A, type D (when applicable) and average gain. The UE may further assume that no DM-RS collides with the SS/PBCH block.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-colocation (QCL) relationship between one or two downlink reference signals and the DMRS ports of the PDSCH, the DMRS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot e.g., $n+3N_{slot}^{subframe,\mu}$.

With reference to UL power control, the UL power control procedure determines a power for PUSCH, PUCCH, SRS, and PRACH transmissions in NR.

If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i,j,q_d,l)$ in dBm in PUSCH transmission occasion i as, $$P_{PUSCH,b,f,c}(i, j, q_d, l) = \min\left\{ \begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{array} \right\}$$

where, $P_{CMAX,f,c}(i)$ is the UE configured maximum output power defined in REF7 for carrier f of serving cell c in PUSCH transmission occasion i.

The corresponding UL transmit power procedures for the cases of PUCCH, SRS and PRACH and the respective use of the UE configured maximum output power to determine the PUCCH, SRS and PRACH transmit power settings are further described in REF4.

With reference to the UE configured maximum output power, the UE is allowed to set its configured maximum output power $P_{CMAX,f,c}$ for carrier f of serving cell c in each slot.

The configured maximum output power $P_{CMAX,f,c}$ is set within the following bounds: $P_{CMAX\_L,f,c} \leq P_{CMAX,f,c} \leq P_{CMAX\_H,f,c}$ with $P_{CMAX\_L,f,c}=$MIN $\{P_{EMAX,c}-\Delta T_{C,c}, (P_{PowerClass}-\Delta P_{PowerClass})$ MAX(MAX(MPR$_c$+$\Delta$MPR$_c$, A-MPR$_c$)+$\Delta T_{IB,c}$+$\Delta T_{C,c}$+$\Delta T_{RxSRs}$, P-MPR$_c$)$\}$ and $P_{CMAX\_H,f,c}=$MIN $\{P_{EMAX,c}, P_{PowerClass}-\Delta P_{PowerClass}\}$ as described in REF7.

Here, $P_{EMAX,c}$ is the value given by either the higher layer provided parameter p-Max or the field additionalPmax of the higher layer provided NR-NS-PmaxList, whichever is applicable according to REF6, and $P_{PowerClass}$ is the maximum UE power of the applicable UE power class specified in REF7 without taking into account the tolerances specified in REF7.

The higher layer provided, e.g., RRC configured parameter p-Max (range from −30 . . . 33) is used to limit the UE's UL transmission power on a carrier frequency and may also be used to calculate compensation factors during cell (re-)selection in RRC_IDLE and/or RRC_INACTIVE states. p-Max is the maximum transmit power allowed in a serving cell with value in dBm. The maximum transmit power that the UE may use on a serving cell may be additionally limited by parameters p-NR-FR1 (configured for the cell group) and by p-UE-FR1 (configured total for all serving cells operating on FR1). If absent, the UE applies the maximum power according to REF7 in case of an FR1 cell or an FR2 cell.

For example, p-Max may be used by the network to provide and configure a value for the UE maximum transmit power in the UL carrier of the serving cell using uplinkConfigCommon or FrequencyInfoUL-SIB, for an SUL carrier using supplementary Uplink, may be used in SIB2 or SIB4 to configure a UE maximum transmit power applicable for intra-frequency neighboring NR cells. For example, p-NR-FR1, e.g., a value for the maximum total transmit power to be used by the UE in the NR cell group across all serving cells in FR1 or p-UE-FR1, e.g., the maximum total transmit power to be used by the UE across all serving cells in FR1 across all cell groups may be configured for the UE by the network using the RRC provided IE PhysicalCellGroupConfig.

With reference to power allocation in the DL, the gNB determines the DL transmit energy per resource element (EPRE).

For cell search, a UE may assume that SSS, PBCH DM-RS, and PBCH data have same EPRE. The UE may assume that the ratio of PSS EPRE to SSS EPRE in a SS/PBCH block is either 0 dB or 3 dB. If the UE has not been provided dedicated higher layer parameters, the UE may assume that the ratio of PDCCH DMRS EPRE to SSS EPRE is within −8 dB and 8 dB when the UE monitors PDCCHs for a DCI format 1_0 with CRC scrambled by SI-RNTI, P-RNTI, or RA-RNTI.

For SS-RSRP, SS-RSRQ and SS-SINR measurements, the UE may assume DL EPRE is constant across the bandwidth. For SS-RSRP, SS-RSRQ and SS-SINR measurements, the UE may assume DL EPRE is constant over SSS carried in different SS/PBCH blocks. For SS-RSRP, SS-RSRQ and SS-SINR measurements, the UE may assume that the ratio of SSS EPRE to PBCH DM-RS EPRE is 0 dB. For CSI-RSRP, CSI-RSRQ and CSI-SINR measurements, the UE may assume DL EPRE of a port of CSI-RS resource configuration is constant across the configured DL bandwidth and constant across all configured OFDM symbols.

The DL SS/PBCH SSS EPRE can be derived from the SS/PBCH DL transmit power given by the parameter ss-PBCH-BlockPower in the range [−60 . . . +50] dBm which is provided to the UE by higher layers. The DL SSS transmit power is defined as the linear average over the power contributions (in [W]) of all resource elements that carry the SSS within the operating system bandwidth.

The DL CSI-RS EPRE can be derived from the SS/PBCH block DL transmit power given by the parameter ss-PBCH-BlockPower and CSI-RS power offset given by the parameter powerControlOffsetSS provided by higher layers, where the CSI-RS is QCLed with the SS/PBCH block, and the SS/PBCH block can be associated with serving cell PCI or additional PCI different from serving cell PCI. The DL reference-signal transmit power is defined as the linear average over the power contributions (in [W]) of the resource elements that carry the configured CSI-RS within the operating system bandwidth. The gNB may configure the UE with parameter powerControlOffsetSS using a value from the set {−3, 0, +3, +6} dB which is the assumed ratio of NZP CSI-RS EPRE to SS/PBCH block EPRE. The network may configure the UE with parameter powerControlOffset with a value in the range of [−8, 15] dB which is the assumed ratio of PDSCH EPRE to NZP CSI-RS EPRE when the UE derives CSI feedback. The higher layer provided parameters powerControlOffsetSS and powerControlOffset may be signaled to the UE using the RRC NZP-CSI-RS-Resource IE. The DL CSI-RS EPRE can be derived from the SS/PBCH block DL transmit power given by the parameter ss-PBCH-BlockPower and CSI-RS power offset given by the parameter powerControlOffsetSS provided by higher layers, where the CSI-RS is QCLed with the SS/PBCH block, and the SS/PBCH block can be associated with serving cell PCI or additional PCI different from serving cell PCI. The DL reference-signal transmit power is defined as the linear average over the power contributions (in [W]) of the resource elements that carry the configured CSI-RS within the operating system bandwidth.

For CSI measurement(s) other than L1-SINR, a UE assumes that each NZP CSI-RS port configured for interference measurement corresponds to an interference transmission layer and that all interference transmission layers on NZP CSI-RS ports for interference measurement take into account the associated EPRE ratios.

For the DL DM-RS associated with PDSCH, the UE may assume the ratio of PDSCH EPRE to DM-RS EPRE ($\beta_{DMR}$ [dB]) is given by REF4 according to the number of DM-RS CDM groups without data as described in REF4. The DM-RS scaling factor $\beta_{PDSCH}^{DMRS}$ specified in REF1 is given by $$\beta_{PDSCH}^{DMRS} = 10^{-\frac{\beta_{DMRS}}{20}}.$$

When the UE is scheduled with one or two PT-RS ports associated with the PDSCH, if the UE is configured with the higher layer parameter epre-Ratio, the ratio of PT-RS EPRE to PDSCH EPRE per layer per RE for each PT-RS port ($\rho_{PTRS}$) is given by REF4 according to the epre-Ratio, the PT-RS scaling factor $\beta_{PTRS}$ specified in REF1 is given by $$\beta_{PTRS} = 10^{\frac{\rho_{PTRS}}{20}},$$

otherwise, the UE assumes epre-Ratio is set to state '0' if not configured.

For link recovery, as described in REF3, the ratio of the PDCCH EPRE to NZP CSI-RS EPRE is assumed as 0 dB.

The UE assumes constant EPRE is used for all REs of a given DL PRS resource.

With reference to power allocation in the DL for IAB nodes, for a serving cell of an IAB-MT, the IAB-MT can be provided a set of TCI states or a set of RS resource indexes corresponding to a SS/PBCH block or to a CSI-RS resource index for a slot where a PDSCH EPRE adjustment is indicated by DL Tx Power Adjustment MAC CE as described in REF5. The PDSCH EPRE can be derived from a DL CSI-RS EPRE as described in REF4 and a PDSCH power offset provided by powerControlOffsetIAB as described in REF5. For a DL DM-RS and/or PT-RS associated with a PDSCH, the IAB-MT may assume that the ratio of PDSCH EPRE to DM-RS EPRE, and/or PT-RS EPRE to PDSCH EPRE, is obtained as for a "UE" described in REF4. If no TCI state or RS resource index is provided to the IAB-MT, the IAB-MT may assume that a same PDSCH EPRE adjustment applies to all TCI states or RS resource indexes configured for the IAB-MT. A PDSCH EPRE adjustment provided by DL Tx Power Adjustment MAC CE may be restricted to frequency resources of an IAB-node that do not result in simultaneous reception on the same frequency resources by an IAB-MT and IAB-DU in a slot.

Figure 6:
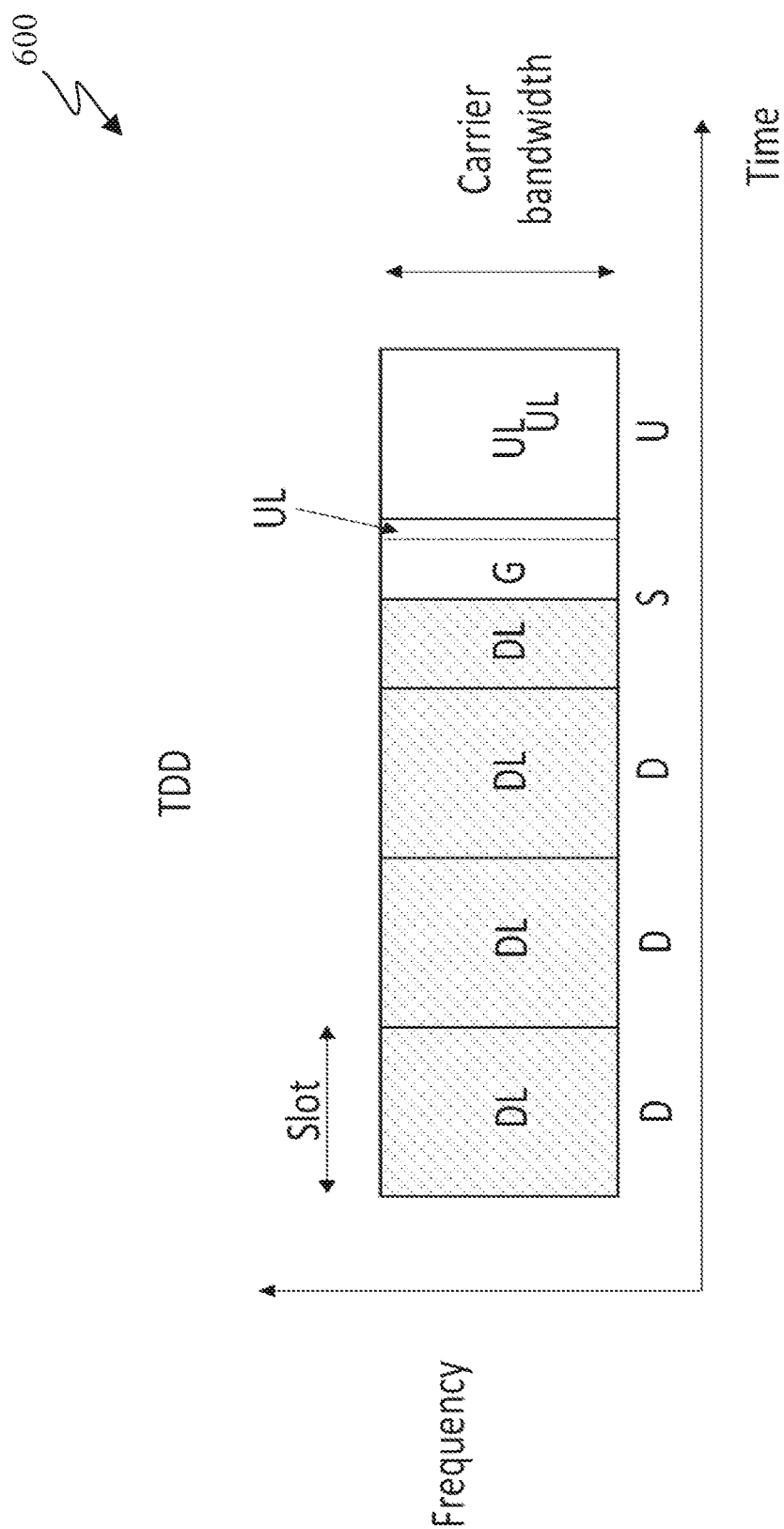
FIG. 6 illustrates an example uplink/downlink (UL-DL) frame configuration in a TDD communications system according to embodiments of the disclosure.

FIG. 6 illustrates an example UL-DL frame configuration in a TDD communications system 600 according to embodiments of the disclosure. The embodiment of the UL-DL frame configuration in a TDD communications system 600 illustrated in FIG. 6 is for illustration only. FIG. 6 does not limit the scope of this disclosure to any particular implementation of the UL-DL frame configuration in a TDD communications system 600.

5G NR radio supports time-division duplex (TDD) operation and frequency division duplex (FDD) operation. Use of FDD or TDD depends on the NR frequency band and per-country allocations. TDD is required in most bands above 2.5 GHz. FIG. 6 illustrates an example structure of slots or single-carrier TDD UL-DL frame configuration for a TDD communications system according to the embodiments of the present disclosure.

A DDDSU UL-DL configuration is shown, where D denotes a DL slot, U denotes an UL slot, and S denotes a special or switching slot with a DL part, a flexible part that can also be used as guard period G for DL-to-UL switching, and optionally an UL part.

TDD has several advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned most time resources in TDD to handle DL-heavy mobile traffic. Another advantage is that channel state information (CSI) can be more easily acquired via channel reciprocity. This reduces an overhead associated with CSI reports especially when there are many antennas or antenna elements.

Although there are advantages of TDD over FDD, there are also disadvantages. A first disadvantage is a smaller coverage of TDD due to the usually small portion of time resources available for UL transmissions, while with FDD all time resources can be used for UL transmissions. Another disadvantage is latency. In TDD, a timing gap between DL reception and UL transmission containing the hybrid automatic repeat request acknowledgement (HARQ-ACK) information associated with DL receptions is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions to improve coverage (an alternative in such case is for a network to forgo HARQ-ACK information at least for some transport blocks in the DL).

To address some of the disadvantages for TDD operation, a dynamic adaptation of link direction has been considered where except for some symbols in some slots supporting predetermined transmissions such as for SSBs, symbols of a slot can have flexible transmission direction, e.g., DL or UL, which a UE can determine according to scheduling information for transmissions or receptions. A PDCCH can also be used to provide a DCI format, such as a DCI format 2_0 as described in REF2 and REF3, that can indicate a link direction of some flexible symbols in one or more slots. Nevertheless, in actual deployments, it is difficult for a gNB scheduler to adapt a transmission direction of symbols without coordination with other gNB schedulers in the network. This is because of cross-link interference (CLI)

where, for example, DL receptions in a cell by a UE can experience large interference from UL transmissions in the same or neighboring cells from other UEs.

Full-duplex (FD) communications offer a potential for increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a full-duplex wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be allocated in the center of a carrier, or at the edge of the carrier, or at a selected frequency-domain position of the carrier. The allocations of DL sub-bands and UL sub-bands may partially or fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

When a UE receives signals/channels from a gNB in a full-duplex slot, the receptions may be scheduled in a DL subband of the full-duplex slot. When full-duplex operation at the gNB uses DL slots for scheduling transmissions from the UE using full-duplex transmission and reception at the gNB, there may be one or multiple, such as two, DL subbands in the full-duplex slot. When a UE is scheduled to transmit in a full-duplex slot, the transmission may be scheduled in an UL subband of the full-duplex slot. When full-duplex operation at the gNB uses UL slots for purpose of scheduling transmissions to UEs using full-duplex transmission and reception at the gNB, there may be one or multiple, such as two, UL subbands in the full-duplex slot. Full-duplex operation using an UL subband or a DL subband may be referred to as Subband-Full-Duplex (SBFD).

For example, when full-duplex operation at the gNB uses a DL or F slot or symbol for scheduling transmissions from the UE using full-duplex transmission and reception at the gNB, there may be one DL subband on the full-duplex slot or symbol and one UL subband of the full-duplex slot or symbol in the NR carrier. A frequency-domain configuration of the DL and UL subbands may then be referred to as 'DU' or 'UD', respectively, depending on whether the UL subband is configured/indicated in the upper or the lower part of the NR carrier. In another example, when full-duplex operation at the gNB uses a DL or F slot or symbol for scheduling transmissions from the UE using full-duplex transmission and reception at the gNB, there may be two, DL subbands and one UL subband on the full-duplex slot or symbol. A frequency-domain configuration of the DL and UL subbands may then be referred to as 'DUD' when the UL subband is configured/indicated in a part of the NR carrier and the DL subbands are configured/indicated at the edges of the NR carrier, respectively.

In the following, for brevity, full-duplex slots/symbols and SBFD slots/symbols may be referred to as SBFD slots/symbol and non-full-duplex slots/symbols and normal DL or UL slot/symbols may be referred to as non-SBFD slots/symbols.

Instead of using a single carrier, it is also possible to use different component carriers (CCs) for receptions and transmissions by a UE. For example, receptions by a UE can occur on a first CC and transmissions by the UE occur on a second CC having a small, including zero, frequency separation from the first CC.

Furthermore, a gNB can operate with full-duplex mode even when a UE still operates in half-duplex mode, such as when the UE can either transmit and receive at a same time, or the UE can also be capable for full-duplex operation.

Full-duplex transmission/reception is not limited to gNBs, TRPs, or UEs, but can also be used for other types of wireless nodes such as relay or repeater nodes.

Full duplex operation needs to overcome several challenges to be functional in actual deployments. When using overlapping frequency resources, received signals are subject to co-channel cross-link interference (CLI) and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Throughout the present disclosure, the term 'full-duplex' (FD) is used as a short form for a full-duplex operation in a wireless system. The terms 'cross-division-duplex' (XDD), 'full-duplex' (FD) and 'subband-full-duplex' (SBFD) may be used interchangeably in the disclosure.

Full-duplex operation in NR can improve spectral efficiency, link robustness, capacity, and latency of UL transmissions. In an NR TDD system, UL transmissions are limited by fewer available transmission opportunities than DL receptions. For example, for NR TDD with SCS=30 kHz, DDDU (2 msec), DDDSU (2.5 msec), or DDDDDDD-SUU (5 msec), the UL-DL configurations allow for an DL:UL ratio from 3:1 to 4:1. Any UL transmission can only occur in a limited number of UL slots, for example every 2, 2.5, or 5 msec, respectively.

Figure 7:
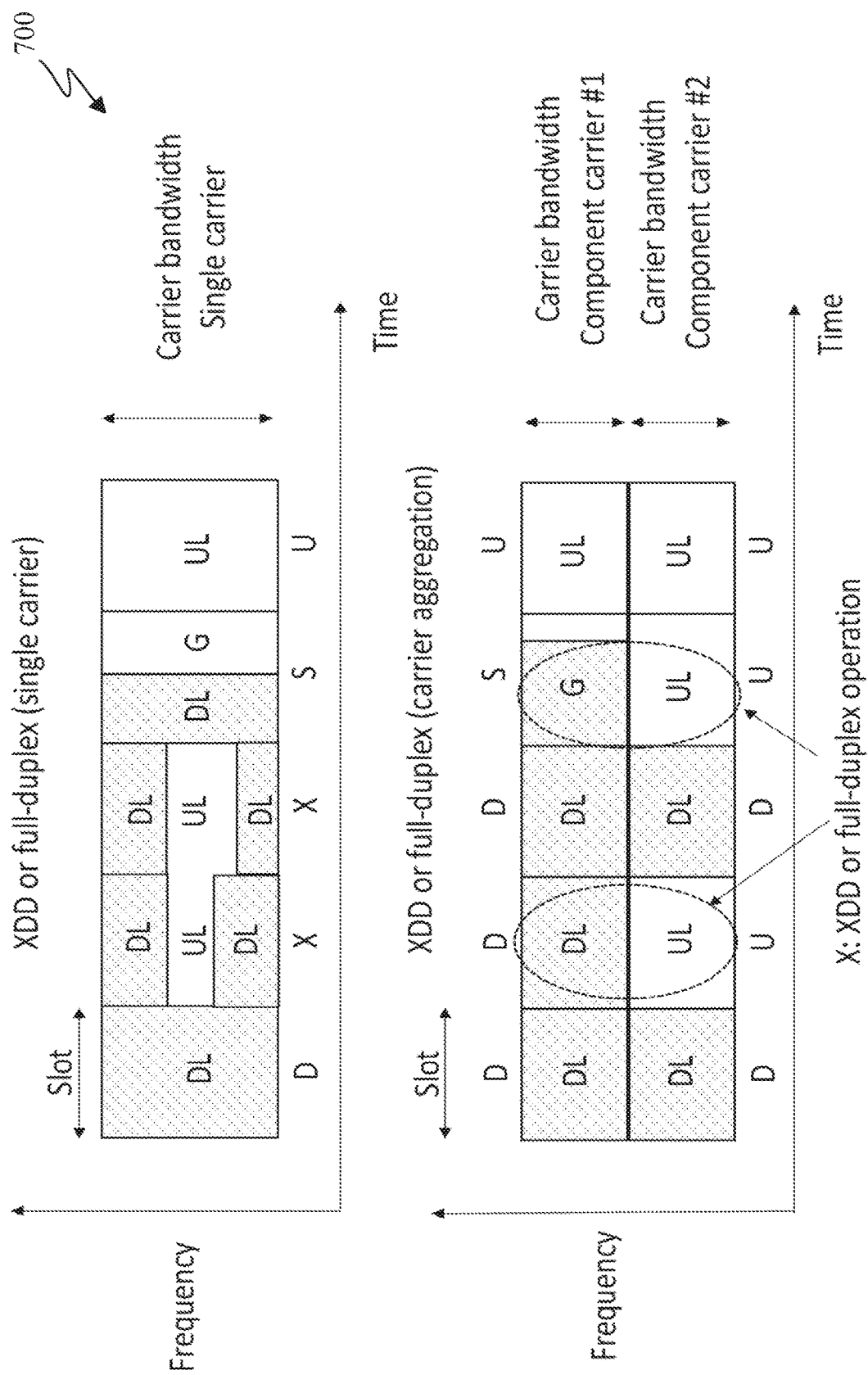
FIG. 7 illustrates example UL-DL frame configurations in a full-duplex communications system according to embodiments of the disclosure.

FIG. 7 illustrates example UL-DL frame configurations in a full-duplex communications system 700 according to embodiments of the disclosure. The embodiment of the UL-DL frame configurations in a full-duplex communications system 700 illustrated in FIG. 7 is for illustration only. FIG. 7 does not limit the scope of this disclosure to any particular implementation of the UL-DL frame configuration in a TDD communications system 700.

FIG. 7 illustrates two example full-duplex configurations using single-carrier and carrier aggregation UL-DL frame configurations according to embodiments of the present disclosure.

For a single carrier TDD configuration with full-duplex enabled, slots denoted as X are full-duplex or XDD slots. Both DL and UL transmissions can be scheduled in XDD slots for at least one or more symbols. The term XDD slot is used to refer to a slot where UEs can simultaneously both receive and transmit in at least one or more symbols of the slot if scheduled or assigned radio resources by the base station. A half-duplex UE cannot both transmit and receive simultaneously in an XDD slot or on a symbol(s) of an XDD slot. When a half-duplex UE is configured for transmission in symbols of an XDD slot, another UE can be configured for reception in the symbols of the XDD slot. A full-duplex UE can transmit and receive simultaneously in symbols of an XDD slot, possibly in presence of other UEs scheduled or assigned resources for either DL or UL in the symbols of the XDD slot. Transmissions by a UE in a first XDD slot can use same or different frequency-domain resources than in a second XDD slot, wherein the resources can differ in bandwidth, a first RB, or a location of the center carrier.

For a carrier aggregation TDD configuration with full-duplex enabled, a UE receives in a slot on CC #1 and transmits in at least one or more symbol(s) of the slot on CC #2. In addition to D slots used only for transmissions/receptions by a gNB/UE, U slots used only for receptions/transmissions by the gNB/UE, and S slots for also supporting DL-UL switching, full-duplex slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for full-duplex operation. UL transmissions can also occur in a last slot (U) where the full UL transmission bandwidth is available. XDD slots or symbol assignments over a period of time and/or a number of slots or symbols can be indicated by a DCI format in a PDCCH reception and can then vary per unit of the time period, or can be indicated by higher layer signaling, such as via a MAC CE or RRC.

Various embodiments of the present disclosure recognize issues when considering UL transmissions in a full-duplex capable wireless communication system. For example, in NR TDD networks with support for full-duplex or XDD operation, the power allocation in the DL by the gNB and the determination of the UL transmit power for the UE become significantly more challenging due to the addition of more UL-to-DL and DL-to-UL interference paths during system operation.

Figure 8:
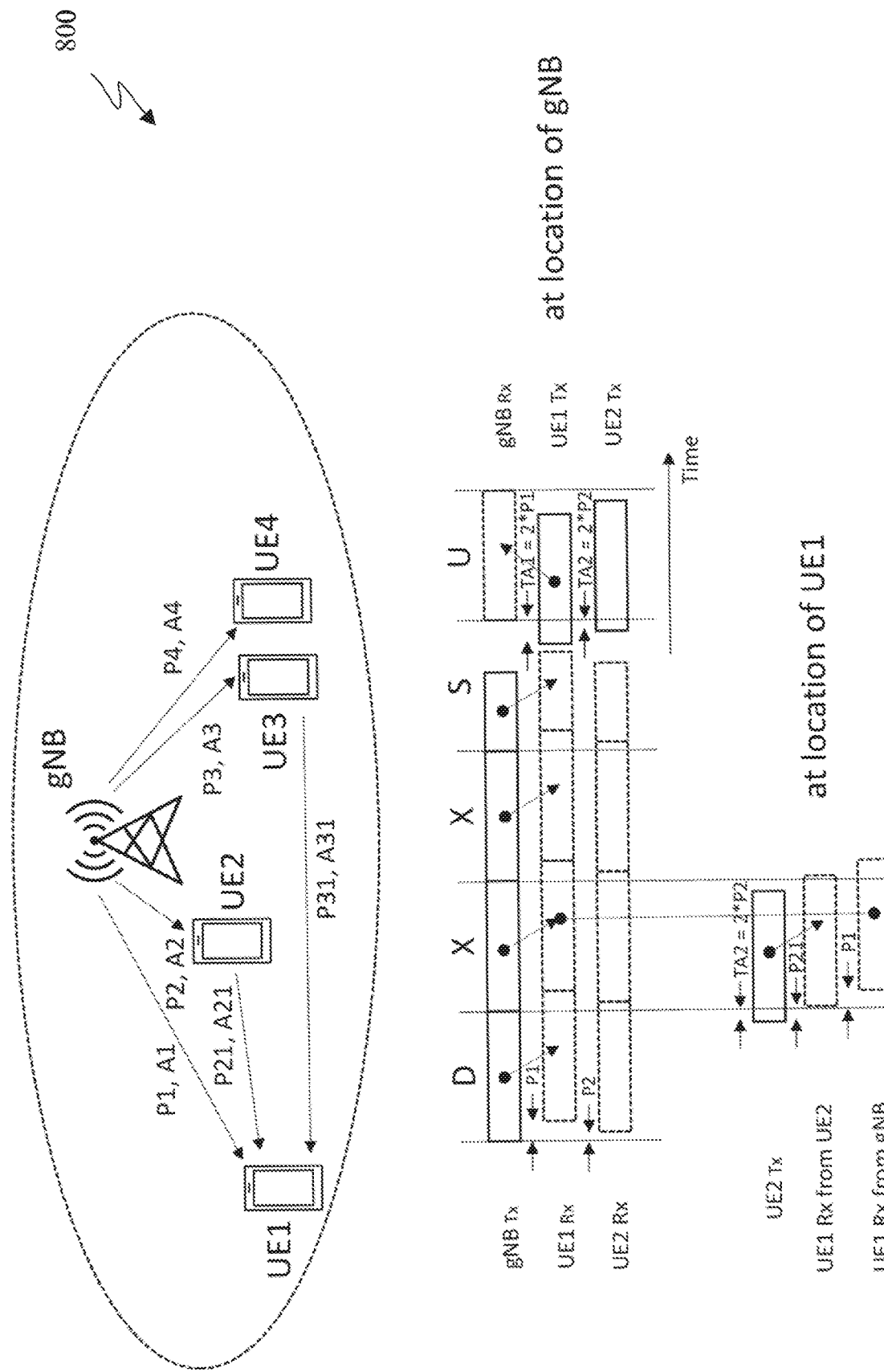
FIG. 8 illustrates an example of transmissions and receptions in a full-duplex communications system according to embodiments of the disclosure.

FIG. 8 illustrates an example of transmissions and receptions in a full-duplex communications system 800 according to embodiments of the present disclosure. The embodiment of the example of transmissions and receptions in a full-duplex communications system 800 illustrated in FIG. 8 is for illustration only. FIG. 8 does not limit the scope of this disclosure to any particular implementation of the example of transmissions and receptions in a full-duplex communications system 800.

In FIG. 8, the NR TDD gNB uses SCS=30 kHz and a UL-DL frame allocation of type DXXSU with duration 2.5 msec. UE1, UE2, UE3 and UE4 are served by gNB. Note that the timing advance settings TA1, TA2, TA3, TA4 for UE1, UE2, UE3, UE4 are determined based on the respective UE distances to gNB. Transmissions and receptions from the gNB to UE1, UE2, UE3, UE4 are subject to one-way propagation delays P1, P2, P3, P4 and are attenuated by radio signal propagation losses A1, A2, A3, A4, respectively. Full-duplex communication is supported by the gNB and enabled in the $2^{nd}$ and $3^{rd}$ slot. In this example, full-duplex communication in the TDD cell uses frequency-orthogonal subbands, e.g., DL transmission from the gNB to a UE in an SBFD DL subband and UL reception from a UE by the gNB in an SBFD UL subband do not overlap in frequency domain. UL transmissions in full-duplex or SBFD slots can be allocated to the center subband in the $2^{nd}$ and $3^{rd}$ slot. UE1-UE4 operate half-duplex, e.g., they can either transmit or receive in a slot, but no simultaneous DL reception and UL transmission from a same UE can occur in a slot.

The small relative distance from UE2 to the gNB results in a small TA2 value and a small attenuation value A2. UE1 is further away from gNB and requires a larger TA1 value and experiences a larger attenuation value A1. UE3 and UE4 require timing advance values with TA2<TA3<TA4<TA1 and experience attenuation values with A2<A3<A4<A1. Interfering UL transmissions from UE2 in the $2^{nd}$ XDD slot are received by UE1 earlier than DL transmissions from the gNB in the slot. UL transmissions from UE2 interfere not only the PDSCH simultaneously transmitted by the gNB to UE1 in the $2^{nd}$ slot but may also interfere the symbols carrying PDCCH at the beginning of the $2^{nd}$ slot. Arrival time of the interfering UL transmission from UE2 at the location of UE1 during DL reception by UE1 in the $2^{nd}$ slot is determined by 3 relative one-way propagation delays, e.g., UE2-gNB (P2), UE1-gNB (P1) and UE2-UE1 (P21). The interfering UL transmission from UE2 at the location of UE1 during DL reception by UE1 in the $2^{nd}$ slot is subject to an attenuation value A21, e.g., the radio propagation loss of an UL transmission from aggressor UE2 when received at the location of victim UE1.

Note that UL-DL interference in the $2^{nd}$ slot occurs even with subband full-duplex operation. The roll-off of the filtered Tx OFDM BB waveform from UE2 creates leakage across the entire channel BW including the SBFD DL subband(s) used for DL reception by UE1 on the same time-domain resources. Guard RBs or guard tones or unused RBs or unused SCs between the SBFD UL and DL subband(s) in the $2^{nd}$ slot can mitigate, but not fully eliminate leakage created by the UL-to-DL interference from UE2 UL transmissions. The amount and severity of leakage and the impact on UE1 demodulation performance depends on the DL receive power levels of the desired DL signal and the interfering UL signal which are a function of the gNB DL transmit power allocation (or EPRE), the distance between gNB and UE1, the UE2 UL transmit power (or EPRE), the distance between UE2 and UE1 and the amount of Tx and Rx filtering by UE1 and UE2.

Using the existing UL transmit power control procedure, a single UE configured maximum output power value p-Max limits the UE's UL transmission power on a carrier frequency, e.g., in a serving cell. Additionally, a single value for p-NR-FR1 and/or p-UE-FR1 may be configured for the total maximum configured output power of a cell group of which the serving cell is part or for all cells configured for the UE in FR1. Similar considerations also apply for operation in FR2 for a serving cell and for a cell group. A consequence is that a same UE configured maximum output power value $P_{CMAX,f,c}(i)$ is then used for UL transmit power control by the UE to determine a maximum transmission power value for PUSCH, PUCCH, SRS or PRACH in a transmission instance irrespective of the slot type, e.g., normal UL slot or full-duplex slot. For example, when p-Max configures the UE with 23 dBm nominal output power, subject to RF tolerances and adjustments as described in REF3 and REF7, the UE when scheduled will then transmit using up to the maximum configured or allowed value of 23 dBm in the time-domain resources, e.g., a symbols of a slot, of the serving cell.

There is a need to separately control the maximum UE configured maximum output power between normal UL slot(s) and the full-duplex slot(s) and separately for different full-duplex slots. One reason is that the maximum possible or allowed UL transmit output power of a UE determines its interference range with respect to co-scheduled UEs in the same and in adjacent cells. When a same maximum UE configured maximum output power setting is used by the UE for the normal UL slot(s) and for the full-duplex slot(s), the corresponding interference ranges of an UL transmission from the UE in these types of slots are then also the same. For full-duplex operation in the serving cell, it is very desirable to limit the interference range of the UE transmitting in the UL using a full-duplex slot when compared to UL transmission using a normal UL slot. The aggressor UE transmitting in the UL using the full-duplex slot interferes the victim UE receiving the DL transmission in the same serving cell and/or the adjacent cell(s). The aggressor UE transmitting in the UL in the normal UL slot does not interfere with the DL transmissions to UE(s) in the same and in adjacent cells assuming a same TDD UL-DL frame configuration is configured for the TDD cells in the deployment and assuming that the guard period is configured sufficiently large. When a same maximum UE configured maximum output power per serving cell is used to control, e.g., to reduce or to limit the interference range of the UE resulting from UL transmissions in a full-duplex slot, the maximum possible or allowed transmit power of the UE in a normal UL slot(s) is then also reduced. This is clearly undesirable, because then either the maximum UL radio range of the UE is reduced, or the UE cannot use its available UL transmission power anymore which reduces UL throughput and spectral efficiency for the UL transmissions from the UE in the normal UL slot.

For transmission and receptions in a full-duplex system, it should be considered that because of gNB antenna panel design, the UL reception in a full, e.g., normal, UL slot may use a different number of TRX or a larger effective Rx area when compared to the SBFD UL subband in an XDD slot. A similar consideration applies to gNB DL transmissions in a full, e.g., normal, DL slot versus XDD slots. For example, the gNB Rx operation in a normal UL slot may use all the available 48 TRX in a 12V×8H×2P panel of size 40×60 cm. The gNB Rx operation in an XDD or full-duplex slot may only use 16 TRX and ⅓ of the panel for Rx operation whereas the remaining 32 TRX and ⅔ of the panel may be used for the simultaneous DL transmissions. The gNB may collect less useful signal energy per received UL symbol in an XDD slot when compared to an UL transmission by the UE in a normal UL slot. There may be less link gain when comparing UL reception in full duplex vs. normal UL slots. When comparing DL transmissions to UEs using a normal DL slot such as those carrying SSB(s) to those using the SBFD DL subband(s) of a full-duplex slot, similarly, these may be subjected to different power allocation constraints and possible gain settings in these different types of slots. Different antenna and panel designs exist to support gNB-side full-duplex operation. Design options may be expected to evolve over time as technology changes. Existing and expected future design options for antenna and panels may have in common that the number of TRXs and the available Tx or Rx aperture area used for Tx and/or Rx in normal DL or UL slots may not the same when compared to the DL transmissions or UL receptions in full-duplex slots.

In the following, unless otherwise explicitly noted, providing a parameter value by higher layers includes providing the parameter value by a system information block (SIB), such as a SIB1, or by a common RRC signaling, or by UE-specific RRC signaling.

In the following, for brevity and conciseness of description, the higher layer provided TDD UL-DL frame configuration refers to tdd-UL-DL-ConfigurationCommon as example for RRC common configuration and/or tdd-UL-DL-ConfigurationDedicated as example for UE-specific configuration. The UE determines a common TDD UL-DL frame configuration of a serving cell by receiving a system information block (SIB) such as a SIB1 when accessing the cell from RRC_IDLE or by common RRC signaling when the UE is configured with Scell(s) or additional SCG(s) by an IE ServingCellConfigCommon in RRC_CONNECTED. The UE determines a dedicated TDD UL-DL frame configuration using the IE ServingCellConfig when the UE is configured with a serving cell, e.g., add or modify, where the serving cell may be the SpCell or an SCell of an MCG or SCG. A TDD UL-DL frame configuration designates a slot or symbol as one of types 'D', 'U' or 'F' using at least one time-domain pattern with configurable periodicity.

In the following, for brevity and conciseness of description, SFI refers to a slot format indicator as example which is configured using higher layer provided IEs such as slotFormatCombination or slotFormatCombinationsPerCell and which is indicated to the UE by group common DCI such as DCI F2_0 where slotFormats are defined in REF3.

In the following, for brevity and conciseness of description, the term xdd-config is used to describe the configuration and parameterization for UE determination of DL receptions and/or UL transmissions in a serving cell supporting full-duplex operation. Note that it is not necessary that the use of full-duplex operation by the gNB in the serving cell when scheduling DL receptions and/or UL transmissions in a slot or symbol is identifiable by or known to the UE. For example, parameters associated with the xdd-config may include a set of time-domain resources, e.g., symbol(s)/slot(s), in which DL receptions or UL transmissions are allowed, possible or disallowed; a range or a set of frequency-domain resources, e.g., serving cell(s), BWP(s), start and/or end or a set of RBs, in which DL receptions or UL transmissions are allowed, possible or disallowed; one or multiple guard intervals for time- and/or frequency domain radio resources during DL receptions or UL transmissions, e.g., guard SCs or RBs, guard symbols; one or multiple resource type(s), e.g., 'simultaneous Tx-Rx', 'Rx only', or 'Tx only' or 'D', 'U', 'F', 'N/A'; one or multiple scheduling behaviors, e.g., "DG only", "CG only", "any". Parameters associated with the xdd-config may include indication(s) or value(s) to determine the (assumed) Tx power settings of DL receptions by the UE, e.g., reference power, EPRE, or power offset of a designated DL channel/or signal type; to determine the UL transmission power and/or spatial settings by the UE. Configuration and/or parameters associated with the xdd-config may be provided to the UE using higher layer signaling, DCI-based signaling and/or MAC CE based signaling. For example, parameters associated with xdd-config may be provided to the UE by means of common RRC signaling using SIB. In another example, parameters associated with xdd-config may be provided to the UE by means of dedicated RRC signaling such as ServingCellConfig. For example, parameters associated with xdd-config may be provided using the RRC-configured TDRA table or PUCCH configuration and/or DCI-based signaling indicates to the UE which configuration should be applied.

Various embodiments of the present disclosure provide methods to configure multiple UE configured maximum output power values for a serving cell using multiple higher layer provided p-Max values configured as absolute and/or relative value settings or provided as A-MPR values. A first and a second UE configured maximum output power value in a serving cell may be associated with a first and a second set of slot(s).

A benefit is that the interference range of the UE transmitting in the UL using a full-duplex slot, e.g., $TSG_2$ can be controlled by the gNB separately when compared to UL transmission using a normal UL slot, e.g., $TSG_1$ from that same UE. When there is need to reduce the UL transmission power from the aggressor UE's UL transmissions in the full-duplex slot(s) to avoid undesired interference levels affecting the victim UEs co-scheduled and receiving in the DL part(s) of the full-duplex slot, a higher UL radio range and higher UL throughput in the normal UL slot are still possible for the aggressor UE transmitting in the UL with fewer or no UL-DL interference paths. The gNB can adjust its receiver processing and UL power control for the aggressor UE accordingly because the UE configured maximum output power value(s) associated with UL transmissions from the aggressor UE in the slots on the serving cell are known to the gNB.

In one embodiment, the UE determines a first and a second UE configured maximum output power value, $P_{CMAX,f,c,1}$ and $P_{CMAX,f,c,2}$ for carrier f of serving cell c. The first UE configured maximum output power value for a serving cell is associated with UL transmissions of a PUCCH, PUSCH, SRS or PRACH by the UE in a first set of slots on the serving cell. The second UE configured maximum output power value for a serving cell is associated with UL transmissions of a PUCCH, PUSCH, SRS or PRACH by the UE in a second set of slots on the serving cell. The first and second set of slots on the serving cell may be referred to as a first Transmission Slot Group $TSG_1$ and a second Transmission Slot Group $TSG_2$. For example, the first and the second set of slots on the serving cell may be configured or indicated to the UE as corresponding to a first set of non-SBFD slots/symbols and corresponding to a second set of SBFD slots/symbols, respectively. A UE may be configured with one or more Transmission Slot Group(s) (TSG(s)) for a serving cell where a TSG is a set of slots of a serving cell associated with a same UE configured maximum output power value. The first and the second UE configured maximum output power value associated with the UE UL transmission power of a PUCCH, PUSCH, SRS or PRACH in a TSG(s) may be provided to the UE by higher layer signaling, e.g., RRC or by MAC CE.

The UE may determine the UL transmission power of a PUSCH, PUCCH, SRS or PRACH in a slot using either the first or the second UE configured maximum output power value to determine the UL transmission power in the first set of slots and or in the second set of slots respectively. A first UE configured maximum output power value may be used by the UE to determine the UL transmission power in a first type of slot(s) and a second UE configured maximum output power value may be used by the UE to determine UL transmission power in a second type of slot(s). For example, the first type of slot(s) may correspond to non-SBFD slot(s) or UL transmission in a normal UL slot. For example, the second type of slot(s) may correspond to SBFD slot(s) or UL transmission in an SBFD UL subband. The UE may determine the UL transmission power in a slot using provided parameters to determine value(s) for the first and the second UE configured maximum output power value, e.g., a first UL transmission power in a first type of slot is determined by the UE using an absolute value and the second UL transmission power in a second type of slot is determined as offset value with respect to the UE configured maximum output power value of the first slot type. Configuration parameters associated with a Transmission Slot Group may be provided to the UE by pre-configuration or by higher layer signaling such as RRC. A timer value or counter value or priority indicator may be associated with a Transmission Slot Group.

For example, the first and the second UE configured maximum output power value may be provided to the UE as two separate absolute values $p\text{-}Max_1$ and $p\text{-}Max_2$, e.g., using a value range from −30 . . . 33 dBm respectively. For example, the first and the second UE configured maximum output power value $p\text{-}Max_1$ and $p\text{-}Max_2$ may be associated with a first set of non-SBFD slots/symbols and with a second set of SBFD slots/symbols, respectively. The UE then determines the UE configured maximum output power for the UL transmit power control as described by REF3 and REF7 using $p\text{-}Max_1$ for the first set of slot(s) and using $p\text{-}Max_2$ for the second set of slot(s). Alternatively, the first and the second value may be provided as a first absolute value $p\text{-}Max_1$ and a second relative offset delta_p-Max to the first absolute value, e.g., the second offset value may use an offset range from −15 . . . 0 dB compared to the first absolute value. The UE then determines the UE configured maximum output power for the UL transmit power control as described by REF3 and REF7 using $p\text{-}Max_1$ for the first set of slot(s) and using $p\text{-}Max_1$+delta_p-Max for the second set of slot(s). For example, the UE may determine the UE configured maximum output power $p\text{-}Max_1$ for UL transmission on non-SBFD slot(s)/symbol(s) such as in a normal UL slot or symbol. For example, the UE may determine the UE configured maximum output power $p\text{-}Max_1$+delta_p-Max for UL transmission in an SBFD UL subband or on an SBFD slot/symbol. In yet another alternative, both the first and the second UE configured maximum output power value may be provided as relative offset values delta_p-$Max_1$ and delta_p-$Max_2$ compared to an RRC configured p-Max value for a serving cell. The UE then determines the UE configured maximum output power for the UL transmit power control as described by REF3 and REF7 using p-Max+delta_p-$Max_{,1}$ for the first set of slot(s) and using p-Max+delta_p-$Max_{,2}$ for the second set of slot(s), respectively. In yet another alternative, the first and the second UE configured maximum output power value may be provided as additional maximum power reduction values A-$MPR_1$ and A-$MPR_2$ associated with a first and a second set of slot(s) of a serving cell. The UE then determines the UE configured maximum output power for the UL transmit power control as described by REF3 and REF7 using p-Max+A-$MPR_1$ for the first set of slot(s) and using p-Max+A-$MPR_2$ for the second set of slot(s). For example, the UE may determine a maximum output power value based on p-Max+A-$MPR_1$ for an UL transmission on non-SBFD slot(s)/symbol(s) and based on p-Max+A-$MPR_2$ for UL transmission on SBFD slots/symbols or in an SBFD UL subband, respectively.

Figure 9:
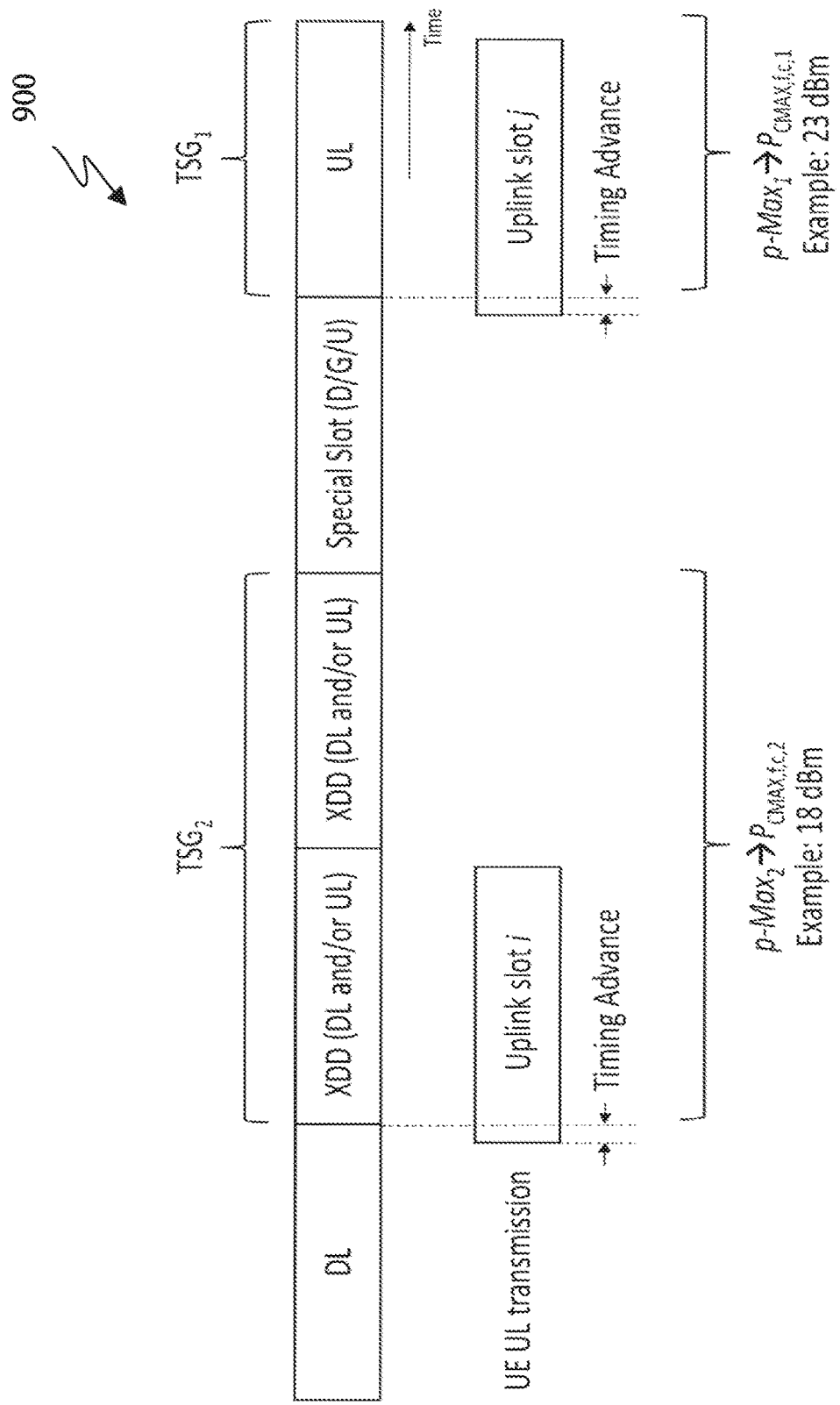
FIG. 9 illustrates an example of UE UL transmission power control with 2 configured maximum output power values per serving cell using p-Max according to embodiments of the present disclosure.

FIG. 9 illustrates an example of UE UL transmission power control with 2 configured maximum output power values per serving cell using p-Max 900 according to embodiments of the present disclosure. The embodiment of the example of UE UL transmission power control with 2 configured maximum output power values per serving cell using p-Max 900 illustrated in FIG. 9 is for illustration only. FIG. 9 does not limit the scope of this disclosure to any particular implementation of the example of UE UL transmission power control with 2 configured maximum output power values per serving cell using p-Max 900.

In one example shown in FIG. 9, the UE is configured with a first and with a second UE configured maximum output power value p-$Max_1$ and p-$Max_2$ to determine a first and a second value, $P_{CMAX,f,c,1}$ and $P_{CMAX,f,c,2}$ for the UL power control on carrier f of serving cell c in a first and a second set of slot(s) respectively. In the example, the UE is provided with a first (higher) configured maximum output power value p-Max$_1$ for UL transmissions using the normal UL slot, e.g., TSG$_1$ and a second (lower) configured maximum output power value p-Max$_2$ for UL transmissions in full-duplex slots, e.g., TSG$_2$.

Figure 10:
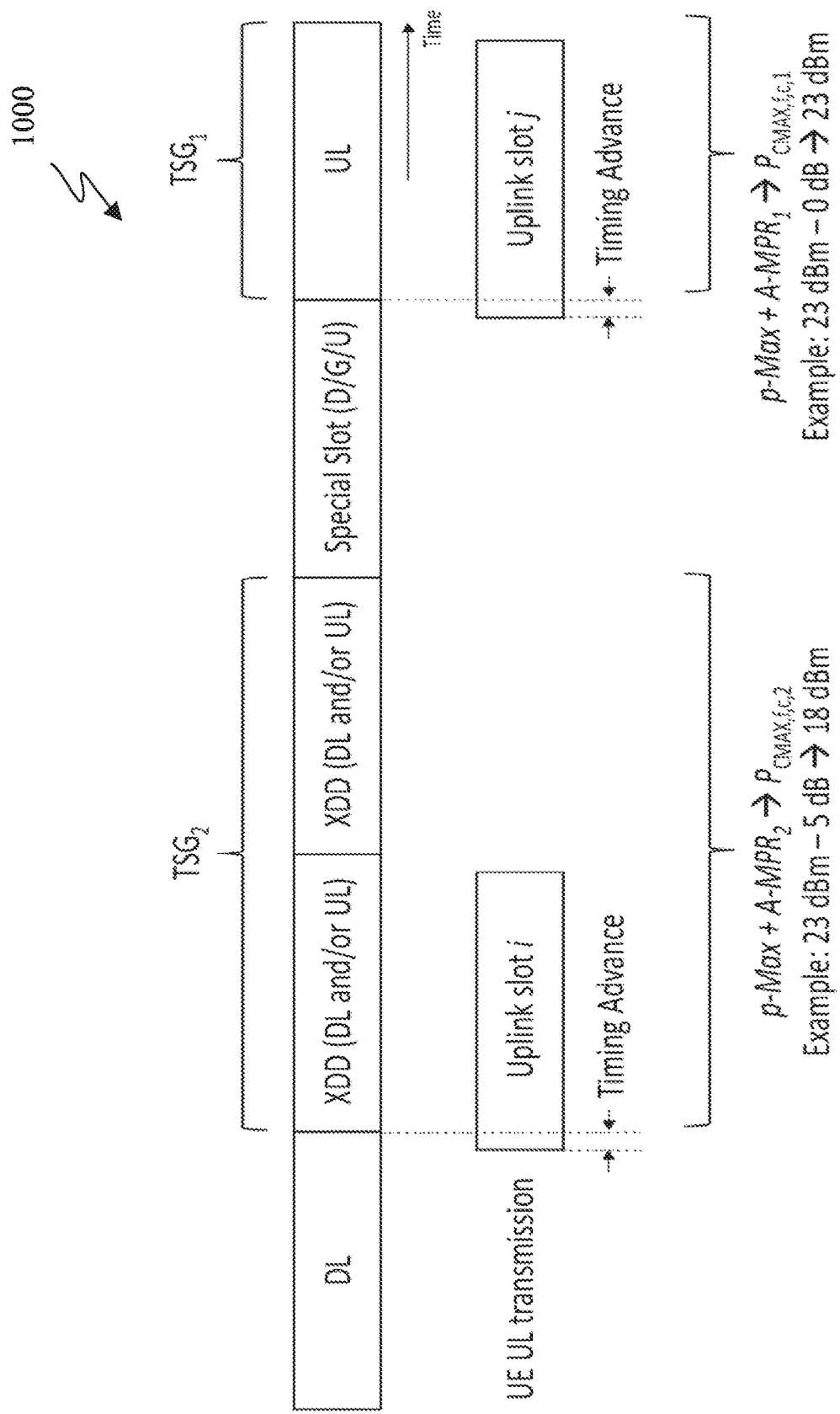
FIG. 10 illustrates an example of UE UL transmission power control with 2 configured maximum output power values per serving cell using p-Max and A-MPR according to embodiments of the present disclosure.

FIG. 10 illustrates an example of UE UL transmission power control with 2 configured maximum output power values per serving cell using p-Max and A-MPR 1000 according to embodiments of the present disclosure. The embodiment of the example of UE UL transmission power control with 2 configured maximum output power values per serving cell using p-Max and A-MPR 1000 illustrated in FIG. 10 is for illustration only. FIG. 10 does not limit the scope of this disclosure to any particular implementation of the example of UE UL transmission power control with 2 configured maximum output power values per serving cell using p-Max and A-MPR 1000.

In another example as shown in FIG. 10, the UE is configured with a first and with a second UE configured maximum output power value using an RRC configured p-Max value for UL transmission in the serving cell and additional maximum power reduction values A-MPR$_1$ and A-MPR$_2$ associated with a first and a second set of slot(s) of a serving cell to determine a first and a second value, P$_{CMAX,f,c,1}$ and P$_{CMAX,f,c,2}$ for the UL power control on carrier f of serving cell c in a first and a second set of slot(s) respectively. In the example, the UE is provided with a first (smaller) configured value A-MPR$_1$ for UL transmissions using the normal UL slot, e.g., TSG$_1$ and a second (larger) configured value A-MPR$_2$ for UL transmissions in full-duplex slots, e.g., TSG$_2$.

A benefit is that the interference range of the UE transmitting in the UL using a full-duplex slot, e.g., TSG$_2$ can be controlled by the gNB separately when compared to UL transmission using a normal UL slot, e.g., TSG$_1$ from that same UE. When there is need to reduce the UL transmission power from the aggressor UE's UL transmissions in the full-duplex slot(s) to avoid undesired interference levels affecting the victim UEs co-scheduled and receiving in the DL part(s) of the full-duplex slot, a higher UL radio range and higher UL throughput in the normal UL slot are still possible for the aggressor UE transmitting in the UL with fewer or no UL-DL interference paths. The gNB can adjust its receiver processing and UL power control for the aggressor UE accordingly because the UE configured maximum output power value(s) associated with UL transmissions from the aggressor UE in the slots on the serving cell are known to the gNB.

The UE may be provided with a first and a second UE configured maximum output power value for a serving cell. When only a single carrier is configured for the UE, the first and the second UE configured maximum output power values, e.g., p-Max$_1$ for the first set of slot(s) and p-Max$_2$ for the second set of slots are provided for that carrier. When carrier aggregation or dual connectivity are configured in the UE, there may be multiple cell groups configured in the UE, e.g., a MCG and/or an SCG. Each of the MCG and/or SCG may comprise one or more component carriers. Each of the cell groups configured in the UE may be configured with parameters p-NR-FR1$_j$ (configured for the cell group) or a total maximum output power for all serving cells operating in FR1 may be provided to the UE as parameter p-UE-FR1$_j$. Here, j=1 or j=2 and possibly different maximum power settings per cell group or for all serving cells operating in FR1 may be configured for the UE in a first set of slot(s), e.g., j=1 and a second set of slot(s), e.g., j=2. Or, the UE may be configured with a same maximum power setting per cell group or for all serving cells. The UE is provided with a first and a second UE configured maximum output power value for a component carrier. A same or different first and a second UE configured maximum output power value(s) may be used by the UE to determine the UL transmit power of PUSCH, PUCCH, SRS or PRACH for multiple component carriers part of the same configured CG or when a Supplemental UL carrier is configured in the UE.

The configured maximum output power P$_{CMAX,f,c,j}$ for j=1 or j=2 may be set within bounds: P$_{CMAX\_L,f,c,j}$ ≤ P$_{CMAX,f,c,j}$ ≤ P$_{CMAX\_H,f,c,j}$ with P$_{CMAX\_L,f,c,j}$ = MIN {P$_{EMAX,c,j}$ − ΔT$_{C,c,j}$, (P$_{PowerClass}$ − ΔP$_{PowerClass}$) − MAX(MAX(MPR$_{c,j}$ + ΔMPR$_{c,j}$, A-MPR$_{c,j}$) + ΔT$_{IB,c,j}$ + ΔT$_{C,c,j}$ + ΔT$_{RxSRS}$, P-MPR$_{c,j}$)} and P$_{CMAX\_H,f,c,j}$ = MIN {P$_{EMAX,c,j}$, P$_{PowerClass}$ − ΔP$_{PowerClass}$} using the notation from REF7. Note that one or more of the correction factors in the equation may have a same value for j=1 or j=2 or they may be determined differently. Here, P$_{EMAX,c,j}$ is the value which may be given by the higher layer provided parameter p-Max$_1$ or the field additionalPmax$_j$ of a higher layer provided NR-NS-PmaxList, and P$_{PowerClass}$ is the maximum UE power of the applicable UE power class.

The first and the second UE configured maximum output power value for a serving cell may be associated with UL transmissions of a PUCCH, PUSCH, SRS or PRACH by the UE in the first and second set of slots on the serving cell respectively. Or the first and the second UE configured maximum output power value for a serving cell may be associated with the UL transmission of a selected or an associated UL signal or channel or transmission format of a type PUCCH, PUSCH, SRS or PRACH. The first and the second UE configured maximum output power value for a serving cell may be associated with a first type of slots, e.g., slot(s) of type 'U' and a second type of slots, e.g., slot(s) of type 'D' or "F". For example, the first and the second UE configured maximum output power value for a serving cell may be associated with a first set of non-SBFD slots/symbols based on configuration or indication of slot/symbol type 'U' and based on a second set of SBFD slots/symbols based on configuration or indication of an SBFD UL subband on slot/symbol type 'D', respectively. For example, a slot or symbol of type 'F' may be configured or indicated for use of the first or the second UE configured maximum output power value.

When an UL transmission is scheduled in a slot of the serving cell, the UE determines the UL transmission power for a PUSCH, PUCCH, SRS or RACH transmission instance in the serving cell using the provided maximum output power value for the associated UL slot(s). For example, for slots numbered from 0 to 4 in the UL-DL frame configuration, if a first maximum output power value is associated with slot 4 and a second maximum output power value is associated with slots 1 and 2, the UE uses the provided output power value of slot 4 to determine P$_{CMAX,f,c,1}$. The UE uses the provided output power value of slot 1 and 2 to determine P$_{CMAX,f,c,2}$.

When an UL transmission is scheduled in a slot of the serving cell, the UE determines the UL transmission power for a PUSCH, PUCCH, SRS or RACH transmission instance in the serving cell using the provided maximum output power value for the associated slot type(s). For example, for 'U' slots in the UL-DL frame configuration, if a first maximum output power value is associated with slot type 'U' and a second maximum output power value is associated with slot type 'D' or 'F', the UE uses the provided output power value of slot type 'U' to determine P$_{CMAX,f,c,1}$. The UE uses the provided output power value of slot type 'D' or 'F' to determine P$_{CMAX,f,c,2}$.

Instead of a UE configured maximum output power value provided for UL transmissions of a PUSCH, PUCCH, SRS or PRACH in a slot interval, a UE configured maximum output power value may be provided for a symbol time interval or a multiple thereof. The time duration(s) need not be the same for a first and a second UE configured maximum output power value. A UE configured maximum output power value may be defined with respect to an adjustable or a scalable step size and/or a desired signal power resolution. For example, a UE configured maximum output power value may be provided as a multiple of M dB, e.g., M=1. The resolution or step size for a first and a second UE configured maximum output power value may be selected the same, or they may be selected differently.

The first and a second UE configured maximum output power value(s) may be provided to the UE by RRC signaling messages and IEs. For example, and without loss of generality, such values may be signaled from the gNB to the UE as part of RRC signaling messages of type RRCSetup, RRCReconfiguration, SIB1 or SystemInformation and may be included in RRC IEs of type ServingCellConfig, ServingCellConfigCommon, or ServingCellConfigSIB1 for a serving cell. The value(s) to configure the maximum output power value(s) for a UE may be of enumerated, listed or sequence type and/or may be encoded as a bit string. When no values are provided to the UE, the UE may select a default value for the maximum output power value. A default value for the maximum output power value may be the maximum UE transmission power as determined by the UE power class when the maximum output power is an absolute value. A default value for the maximum output power value may be 0 when the maximum output power in a slot is determined as relative offset or A-MPR value with respect to p-Max.

The value(s) to configure the maximum output power value(s) for UL transmissions by the UE associated with a set of time-domain resources may be provided to the UE for intra-frequency or inter-frequency neighbor cells, e.g., using SIB2 or SIB4 when configuring cell (re-) selection parameters.

In another embodiment, a UE configured maximum output power value provided to the UE may be associated with a set of slots of a serving cell. A set of slots of a serving cell for which a same maximum output power value is provided to the UE is referred to as Transmission Slot Group (TSG) in the disclosure. The first maximum output power value p-Max$_1$ for a serving cell is associated with UL transmissions by the UE for a first set of slots on the serving cell. The second maximum output power value p-Max$_2$ for a serving cell is associated with UL transmissions by the UE for a second set of slots on the serving cell. For example, the first and the second UE configured maximum output power value p-Max$_1$ and p-Max$_2$ may be associated with a first set of non-SBFD slots/symbols and with a second set of SBFD slots/symbols, respectively. The first and second set of slots on the serving cell may be referred to as a first Transmission Slot Group TSG$_1$ and a second Transmission Slot Group TSG$_2$. A UE can be configured with one or more Transmission Slot Group(s) (TSG(s)) for a serving cell where a TSG is a set of slots of a serving cell associated with a same signaled maximum output power value. A TSG containing a first number of slot(s) may be referred to as Primary Transmission Slot Group (PTSG), whereas the term Secondary Transmission Slot Group (STSG) may refer to other TSGs. For example, a PTSG may be associated with non-SBFD slots/symbols and an STSG may be associated with SBFD slots/symbols, respectively. For example, an STSG may be configured to comprise slots of type 'D' or 'F' where UL transmission from the UE in an SBFD UL subband may be scheduled, whereas a PTSG may be configured for UL transmissions from the UE in slots of type 'U'. A TSG may be configured to contain only a single slot, or there may be only a single TSG, e.g., the TSG comprises all slots. The determination of the UL transmission power by the UE in a slot may then be described by not using the term "TSG" and substituting the term "slot" for it. When a TSG comprise more than one slot, the slots of the TSG can be consecutive, or they can be non-consecutive. One or multiple TSGs may be configured for the UE by parameter n-tsgList. For example, a first TSG containing a first number of slots for UL transmission may be configured in the UE. A second TSG containing a second number of slots for UL transmission may be configured in the UE. When a maximum output power value is provided for a TSG, the value is applied by the UE to determine the UL transmission power for a slot in the TSG. The maximum output power value is not applied by the UE to determine the UL transmission power in a slot when the slot is not part of the TSG. One or multiple maximum output power value(s) may be associated with a TSG, e.g., one or more values may be provided to the UE and the UE selects one according to a suitable set of rules and/or conditions.

For example, to configure a first and second set of slots on the serving cell referred to as a first Transmission Slot Group TSG$_1$ and a second Transmission Slot Group TSG$_2$, a configuration for n-tsgList may be provided as SEQUENCE (SIZE (1 . . . maxNrofTSGs)) OF Tsg where 'Tsg' is a bit string of size M. For example, M=5 or a multiple thereof. When Tsg={01100}, the $2^{nd}$ and $3^{rd}$ slot or slot 1 and 2 in a sequence of 5 slots numbered from 0 to 4 are part of the transmission slot group. When Tsg={00001}, only the last slot in a sequence of 5 slots is indicated as part of the transmission slot group. A maximum output power value may then be associated with the transmission slot group.

Figure 11:
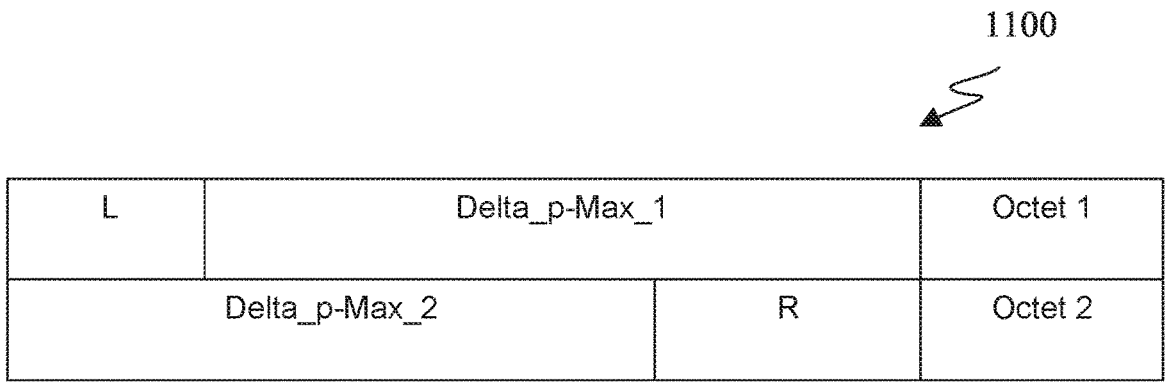
FIG. 11 illustrates an example UL Transmit Power medium access control control element (MAC CE) according to embodiments of the present disclosure.

FIG. 11 illustrates an example UL Transmit Power MAC CE 1100 according to embodiments of the present disclosure. The embodiment of the example UL Transmit Power MAC CE 1100 illustrated in FIG. 11 is for illustration only. FIG. 11 does not limit the scope of this disclosure to any particular implementation of the example UL Transmit Power MAC CE 1100.

In another embodiment, the first and a second UE configured maximum output power value(s) associated with different transmission slot groups on a serving cell may be provided to the UE by MAC CE. Indications to update the first and second maximum output power value(s) maintained by the UE for a serving cell may be provided to the UE by a same or by different UL Transmit Power Command(s).

In one example shown in FIG. 11, the first and the second UE configured maximum output power value are adjusted by the UE using relative offset values delta_p-Max$_1$ and delta_p-Max$_2$ compared to an RRC configured p-Max value for a serving cell. The relative offset values delta_p-Max$_1$ and delta_p-Max$_1$ are provided to the UE in a new UL Transmit Power MAC CE. The MAC CE may have length N=2 octets, or N for any required number of octets or bits. The gNB transmits and the UE receives the MAC CE associated with the first and the second maximum output power value(s) as part of an DL transmission. FIG. 11 shows the example of a length N=2 octets MAC CE format where both the first and a second relative offset values delta_p-Max$_1$ and delta_p-Max$_1$ for a first and a second set of slot(s) respectively are provided to the UE using a same MAC CE. The MAC CE may be identified by either a selected LCID or a selected eLCID value or a combination of LCID and eLCID values. The MAC CE has fixed size and consists of two octets. It contains the Length field L with size of 2 bits to indicate the number of relative offset values delta_p-Max$_1$ signaled in sequence using the same MAC CE. The MAC CE then contains two relative offset values for delta_p-Max$_1$ and delta_p-Max$_1$ for a first and a second set of slot(s) respectively. The 2 reserved bits "R" are set to "0". The UE may determine the relative offset values delta_p-Max$_j$ from index values in the Delta_p-Max_j fields.

As can be understood, the naming or labeling of the new UL Transmit Power MAC CE format or the included IEs to adjust the maximum output power of a UE in a set of slots of the serving cell is not important for as long as it is distinct from currently named IEs and parameterization provided by REF5. The new UL Transmit Power MAC CE may include additional fields not shown in the examples provided by FIG. 11. The field length(s) to signal a maximum output power may be chosen differently as a function of the required step size, resolution and range for minimum or maximum value(s). Values may be signaled as absolute maximum transmit power values or as relative offsets.

Figure 12:
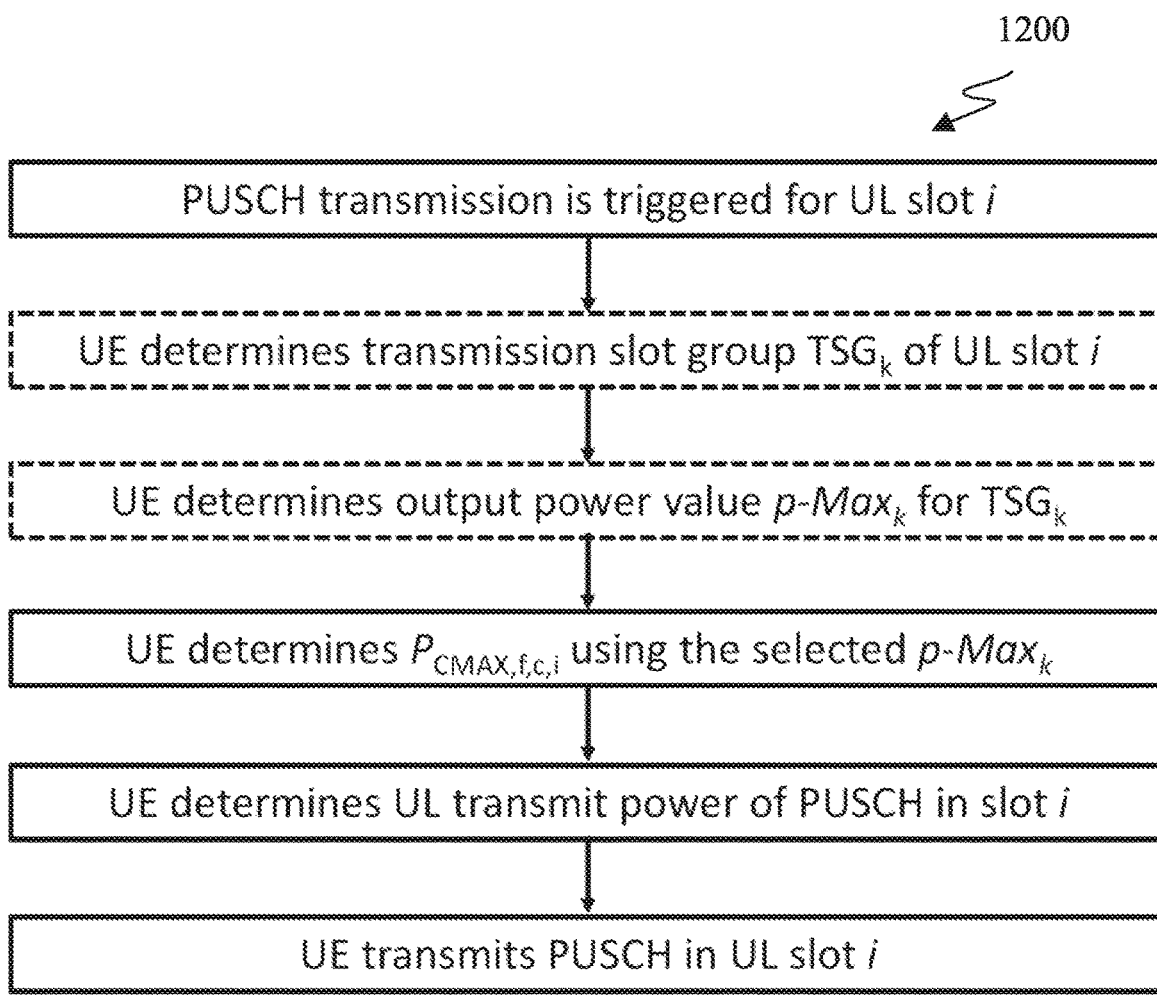
FIG. 12 illustrates an example method performed by a UE for determining the maximum output power for a physical uplink shared channel (PUSCH) transmission in a slot using p-Max according to embodiments of the present disclosure.

FIG. 12 illustrates an example method 1200 performed by a UE for determining the maximum output power for a PUSCH transmission in a slot using p-Max according to embodiments of the present disclosure. The embodiment of the example method 1200 performed by a UE for determining the maximum output power for a PUSCH transmission in a slot using p-Max illustrated in FIG. 12 is for illustration only. FIG. 12 does not limit the scope of this disclosure to any particular implementation of the example method 1200 performed by a UE for determining the maximum output power for a PUSCH transmission in a slot using p-Max.

As illustrated in FIG. 12, a UE (such as the UE 116) determines that a PUSCH transmission is scheduled in slot i. The UE determines the transmission slot group k of the slot i for the PUSCH transmission. The UE determines a maximum configured output power value p-Max$_k$ for the transmission slot group k in which slot i is configured. The UE determines $P_{CMAX,f,c,i}$ using the selected p-Max$_k$. The UE determines an UL transmission power for the PUSCH transmission in slot i as described in REF3 using the determined $P_{CMAX,f,c,i}$ value for slot i and applies the computed UL transmission power value to transmit the PUSCH in slot i. The UE transmits the PUSCH in UL slot i.

Figure 13:
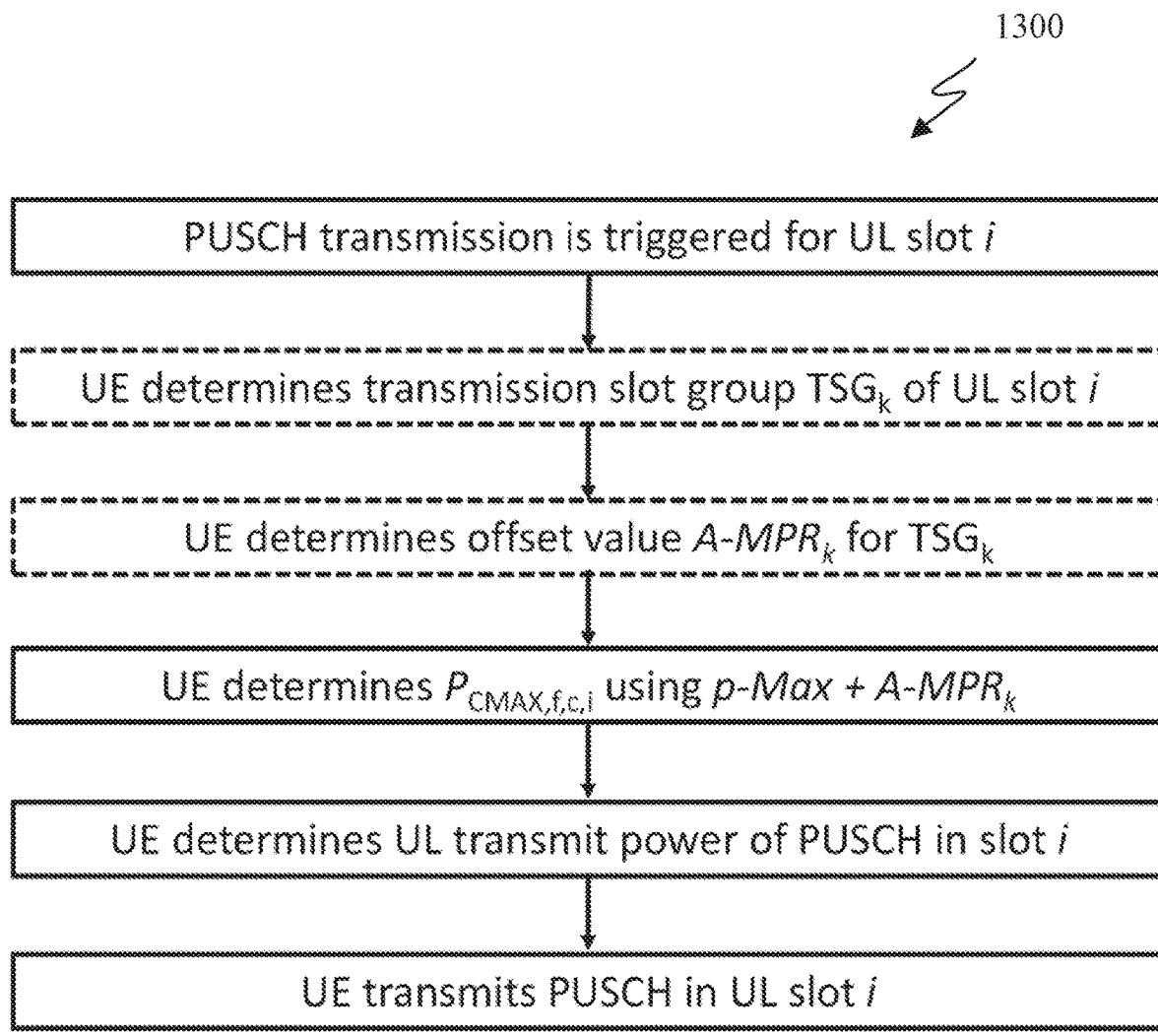
FIG. 13 illustrates an example method performed by a UE for determining the maximum output power for a PUSCH transmission in a slot using p-Max and A-MPR according to embodiments of the present disclosure.

FIG. 13 illustrates an example method 1300 performed by a UE for determining the maximum output power for a PUSCH transmission in a slot using p-Max and A-MPR according to embodiments of the present disclosure. The embodiment of the example method 1300 performed by a UE for determining the maximum output power for a PUSCH transmission in a slot using p-Max and A-MPR illustrated in FIG. 13 is for illustration only. FIG. 13 does not limit the scope of this disclosure to any particular implementation of the example method 1300 performed by a UE for determining the maximum output power for a PUSCH transmission in a slot using p-Max and A-MPR.

As illustrated in FIG. 13, a UE (such as the UE 116) determines that a PUSCH transmission is scheduled in slot i. The UE determines the transmission slot group k of the slot i for the PUSCH transmission. The UE determines an offset value A-MPR$_k$ for the transmission slot group k in which slot i is configured. The UE determines the maximum output power value $P_{CMAX,f,c,i}$ using the absolute value p_Max configured for the serving cell and the selected offset value A-MPR$_k$. The UE determines an UL transmission power for the PUSCH transmission in slot i as described in REF3 using the determined $P_{CMAX,f,c,i}$ value for slot i and applies the computed UL transmission power value to transmit the PUSCH in slot i. The UE transmits the PUSCH in UL slot i.

In NR TDD networks with support for full-duplex or XDD operation, the power allocation for DL by the gNB and the determination of the UL transmit power for the UE become significantly more challenging due to the addition of more UL-to-DL and DL-to-UL interference paths during system operation. While the existing NR procedure provides much flexibility to the gNB scheduler to select or adjust the actual selected DL transmission power allocation or EPRE(s) of the DL signal(s) or channel(s) in the frequency-domain, e.g., across the DL channel BW, and in time-domain, e.g., across symbols or slots according to a variety of needs, this approach is insufficient in a TDD system using full-duplex operation.

Using the existing NR procedures, when NZP CSI-RS are configured in a CSI-RS bandwidth on a symbol for CSI-based measurements and where the UE implementation can benefit from a decoding assumption when estimating the received signal level(s) using CSI-RS RE(s), the gNB may signal the parameter powerControlOffsetSS to the UE. The UE may compute an assumed CSI-RS EPRE value with respect to the SS/PBCH SSS EPRE.

However, the gNB determines the actual PDSCH EPRE or PDCCH EPRE for DL transmissions. The UE is not provided with a decoding assumption with respect to the maximum, or the minimum, the range or the value set(s) of the PDSCH EPRE used by the gNB in the DL transmission instance(s), e.g., in a slot or symbol(s). The gNB may signal the parameter powerControlOffset to the UE. The UE may compute an assumed ratio of PDSCH EPRE to NZP CSI-RS EPRE for purpose of deriving and reporting the CSI feedback. In a slot where a NZP CSI-RS resource is configured and/or activated for CSI reporting for the UE, the assumed PDSCH EPRE can be set within a range of [−8, 15] dB with respect to the assumed CSI-RS EPRE using the provided parameter powerControlOffset. In a slot where no NZP CSI-RS is configured and/or activated, the UE can make no such assumption about the actual PDSCH EPRE.

The UE is not provided with a decoding assumption with respect to the maximum, or the minimum, the range or the value set(s) of the PDCCH EPRE used by the gNB in a DL transmission instance, e.g., in a slot or symbol(s), except for the case of cell search and reception of CORESET #0 when demodulating and/or decoding the SI, Paging or RAR from the serving cell.

Various embodiments of the present disclosure recognize an issue relating to the power allocations for DL for the PDSCH and PDCCH in a TDD cell supporting full-duplex operation.

Using existing NR procedures, the gNB determines the actual PDSCH Tx EPRE or PDCCH Tx EPRE settings for DL transmissions according to its needs, even if the UE is allowed to compute an assumed ratio of PDSCH Rx EPRE to NZP CSI-RS Rx EPRE using the parameter powerControlOffset for deriving and reporting the CSI feedback. Accordingly, the UE implementation needs to rely on AGC in a slot when receiving the PDCCH or PDSCH, e.g., using the known DMRS REs or using the tracking signals such as a set of 4 CSI-RS resources with row index 1 in REF1 configured as TRS when present in a slot.

When considering full-duplex transmissions and receptions, there is need to apply different Tx EPRE settings at the gNB when transmitting the PDSCH or PDCCH in the first (upper part of carrier BW) SBFD DL subband and the second (lower part of carrier BW) SBFD DL subband of the full-duplex slot or when using the SBFD UL subband (such as when the UL subband is used for DL transmissions) in the full-duplex slot. Similar considerations apply when PDSCH or PDCCH are transmitted using frequency-domain resources of both SBFD DL subbands and/or are transmitted using frequency-domain resources across the SBFD DL subband(s) and the SBFD UL subband of the full-duplex slot.

One reason is that the number of TRXs and the available Tx aperture area available to the gNB for DL transmission in the normal DL slot(s) may not the same when compared to the DL transmissions in the full-duplex slot(s). Therefore, the difference of coupling losses between gNB and UE for DL transmissions using these different types of slots are much increased when compared to a conventional TDD system. Another reason is that even when digital BF is used, a different number of TRX may be available to the gNB for DL beamforming operation in the first (upper part of carrier BW) and the second (lower part of carrier BW) DL parts of the full-duplex slot resulting in Tx power imbalances. Another reason is the presence of Tx-Rx interference cancellation at the gNB when operating in full-duplex. Solutions to cancel the co-channel cross-link interference (CLI) from the gNB side DL transmitter may include passive methods which rely on the antenna isolation between transmit and receive antennas, active methods which utilize RF or digital signal processing, hybrid methods using a combination of these, and filtering. For example, antenna SIC may be used to minimize the leakage power from the Tx ports to the Rx ports and digital SIC may be used to handle any residual interference after antenna SIC. DL out-band signal power flowing into the UL receiver path can be effectively suppressed below the noise floor level by the gNB to guarantee the UL receiver performance. Also, by combining digital pre-distortion (DPD) at the Tx path and digital SIC at the Rx path, the out-band interference from the DL signal to the UL signal can be mitigated such that the need for a guard band between the UL and DL signals is minimized. In particular, when implemented at the Tx side, such operation relies on high-power electronic filtering components which are subject to maximum operating power constraints. For example, yield and operational reliability of Tx side filters impose a maximum output power constraint for DL gNB transmissions in the full-duplex slots. Therefore, the Tx EPRE of DL transmissions in full duplex slots may not exceed a maximum power level.

Using existing NR procedures, DL transmissions of DL signal(s) and channel(s), e.g., PDSCH and PDCCH to UEs are therefore subjected to a significantly larger variability of DL Tx EPRE in the full-duplex system and may need to be restricted in full-duplex slots. This increases the complexity of UE-side AGC implementation to estimate and track the DL received signal variations and/or may significantly increase the need to configure DL tracking signals for purpose of DL transmissions using normal DL and/or full-duplex slots/symbols which decreases DL throughput or spectral efficiency due to need for additional overhead.

Various embodiments of the present disclosure recognize issues relating to the power allocations for DL for the CSI-RS in a TDD cell supporting full-duplex operation.

The CSI frequency occupation, e.g., the starting position and the number of the RBs in which the UE is configured with the channel state information measurement resource(s), e.g., the NZP CSI-RS resource(s) or CSI-IM resource(s) is provided to the UE using higher-layer parameters freqBand and density in the CSI-RS-ResourceMapping IE for the CSI resource in the CSI resource set such as signaled by the CSI-ResourceConfig IE with respect to the bandwidth part. Similar considerations apply to the case of the CSI-IM. Similar considerations apply to the frequency occupation for the case where CSI-RS are configured in the UE for mobility such as signaled by the CSI-RS-CellMobility IE. The number of PRBs across which the CSI resource spans only allows for multiples of 4 and is contiguous. The smallest configurable number is the minimum of 24 and the width of the associated BWP. If the configured value is larger than the width of the corresponding BWP, the UE may assume that the actual CSI-RS bandwidth is equal to the width of the BWP.

Figure 14:
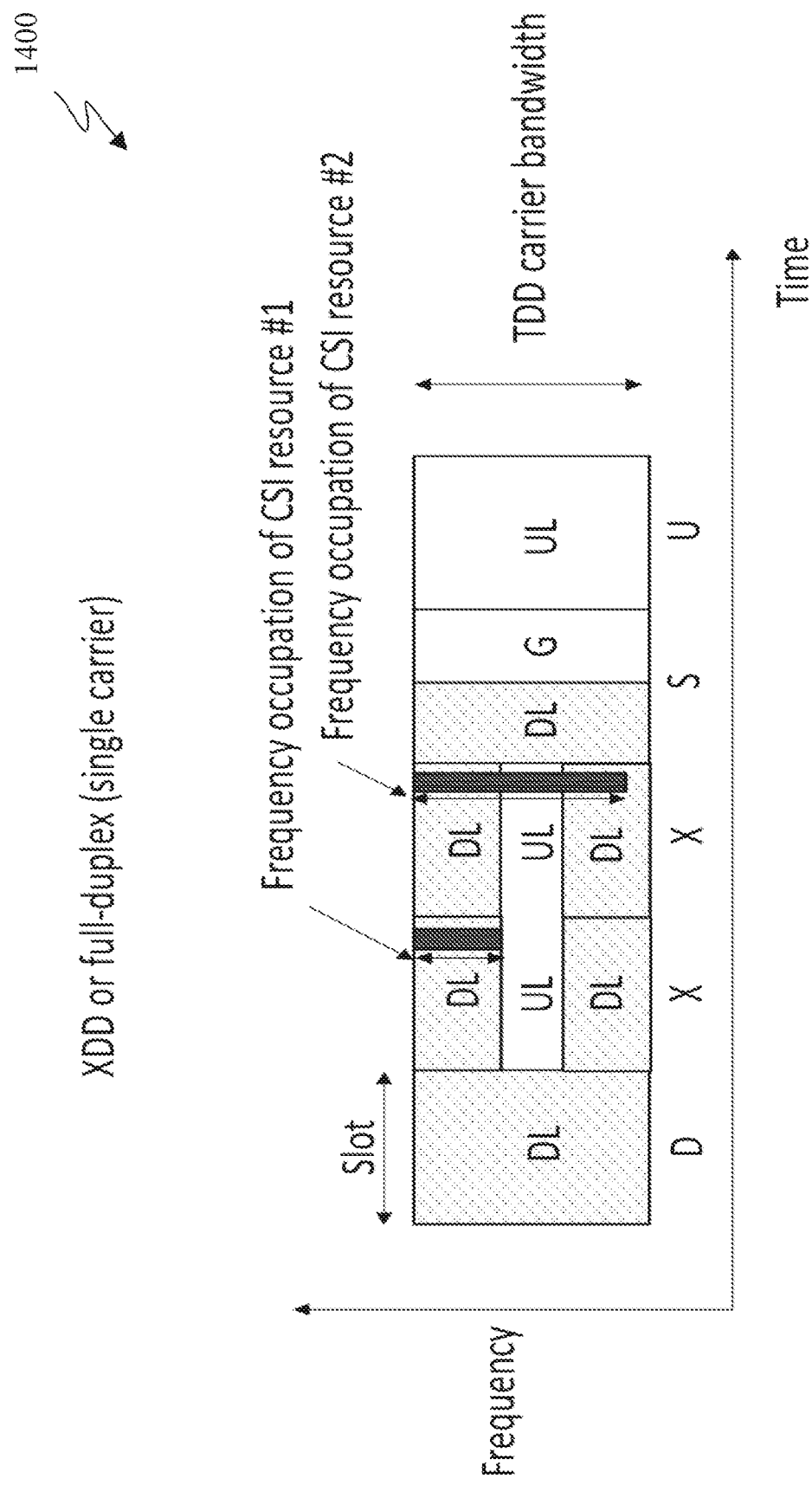
FIG. 14 illustrates an example of channel state information (CSI) resource configuration in a full-duplex communications system according to embodiments of the present disclosure.

FIG. 14 illustrates an example of CSI resource configuration in a full-duplex communications system 1400 according to embodiments of the present disclosure. The embodiment of the example of CSI resource configuration in a full-duplex communications system 1400 illustrated in FIG. 14 is for illustration only. FIG. 14 does not limit the scope of this disclosure to any particular implementation of the example of CSI resource configuration in a full-duplex communications system 1400.

As illustrated in FIG. 14, using the existing NR procedures, the CSI resource can be configured with a frequency occupation located outside the UL subband of a full-duplex slot, or can be configured across, e.g., comprising the SBFD UL subband of a full-duplex slot. Partial overlap, e.g., the CSI resource(s) is configured with a frequency occupation comprising parts of the UL subband of a full-duplex slot is also possible although not shown in FIG. 14.

When considering full-duplex transmissions and receptions, there is need to apply different CSI-RS Tx EPRE settings at the gNB when transmitting the CSI-RS REs of a CSI-RS resource (or CSI-RS resource set) in the SBFD DL subband(s) of the full-duplex slot.

One reason is that even when digital BF is used, a different number of TRX may be available to the gNB for DL beamforming operation in the first SBFD DL subband (upper part of carrier BW) and the second SBFD DL subband (lower part of carrier BW) of the full-duplex slot resulting in Tx power imbalances. Another reason is the Tx-Rx interference cancellation operation in the gNB in presence of DL and UL scheduling. Equal RB occupancy in the first and second DL parts of the full-duplex slot is not always possible due to varying UE traffic load. Similarly, an equal or balanced RB occupancy in the SBFD UL subband is not always possible. The Tx EPRE of the DL signal(s) or channel(s) may be adjusted accordingly by the gNB accounting for DL and/or UL scheduling in the full-duplex slot. However, unequal Tx EPREs for a same DL signal transmitted in the first and the second DL subband(s) of the full-duplex slot then result. In the case of the CSI-RS, the achievable measurement accuracy of the UE CSI reporting or RRM measurements is then also negatively affected, because the UE is provided with a decoding assumption to estimate the received signal level(s) using CSI-RS RE(s), e.g., the UE assumes a single CSI-RS Rx EPRE value with respect to the SS/PBCH SSS Rx EPRE for the entire configured frequency occupation of the CSI resource. Using multiple CSI-RS resources with a frequency occupation limited to either the first or the second SBFD DL subband or the SBFD UL subband (such as for use with aperiodic CSI reports when scheduling the SBFD UL subband for DL transmissions) in the full-duplex slot, UE complexity is increased, or CSI report restrictions are introduced due to the resulting need to support more concurrently active CSI configurations for UE operation in the full-duplex system. This is undesirable.

Various embodiments of the present disclosure recognize issues relating to the power allocations for DL in a wireless communication system supporting full-duplex operation. Accordingly, various embodiments of the present disclosure provide methods to configure for and/or signal to the UE adjustable DL EPRE value(s) for PDSCH, PDCCH or DMRS, PTRS in slots configured for full-duplex operation as DL power adjustment. The UE then determines an assumed PDSCH, PDCCH or DMRS, PTRS power level for reception in full-duplex slots using the DL reference power to adjusts its receiver settings. Multiple CSI-RS EPRE values may be configured for DL reception by the UE and CSI reporting from the UE in a full-duplex slot on a same time-domain resource.

The UE is provided with a configurable or indicated DL power adjustment value PA allowing to determine an adjusted or assumed PDSCH or PDCCH transmission or reception power level on a full-duplex or an SBFD slot/symbol with respect to a suitably chosen DL reference signal and power level. For example, the DL SS/PBCH SSS EPRE or the NZP CSI-RS EPRE may be selected as DL reference signal or power level in the serving cell. For example, the configurable or indicated DL power adjustment value PA is provided with respect to a PDSCH or PDCCH configured for the UE in one or more slots in which full-duplex operation using the same time-domain resource(s) is supported. A DL power adjustment value PA may be associated with a DL signal/channel of type PDSCH, PDCCH or DMRS, PTRS.

For example, multiple values of the configured or indicated DL power adjustment PA for the PDSCH, PDCCH or DMRS, PTRS may be provided to the UE for different SBFD slot(s) or symbol(s) or for different SBFD subbands on a same time-domain resource, or a same PA value may be configured for multiple SBFD slots or symbols or for different SBFD subbands. For example, a value of the DL power adjustment PA for the PDSCH, PDCCH or DMRS, PTRS may be associated with a PDSCH, PDCCH or DMRS, PTRS configuration, a transmission duration or validity period. Different PDSCH, PDCCH or DMRS, PTRS configurations may have different associated DL power adjustment values or may have different associated transmission durations or validity periods, or a same DL power adjustment or transmission duration or validity period may be assumed by the UE. A same DL power adjustment value PA for the PDSCH, PDCCH or DMRS, PTRS may be provided for multiple UEs to determine the adjusted or assumed DL power adjustment in an SBFD slot or symbol, or different PA values may be provided for different UEs. One or multiple DL power adjustment value(s) PA may be configured for a same time-domain resource for the PDSCH, PDCCH or DMRS, PTRS. The determination of a second DL power adjustment value $PA_2$ by the UE may depend on and be a function of a first provided DL power adjustment value $PA_1$, e.g., the UE determines $PA_2$ as relative value compared to or as offset to $PA_1$. The PA value(s) including their associated slot(s), the PDSCH, PDCCH or DMRS, PTRS configuration(s) and/or validity period(s) may be provided to a UE by one or a combination of L1 control signaling by DCI, RRC signaling and/or configuration, tabulated and/or listed by system operating specifications, or MAC CE signaling. If a same DL power adjustment value PA for the PDSCH, PDCCH or DMRS, PTRS is provided for multiple UEs, a common DCI or common RRC signaling message may be used. A UE-specific DCI or RRC signaling of dedicated or common type may be used to provide value(s) of PA to a UE. Only a first DL power adjustment value $PA_1$ for PDSCH, PDCCH or DMRS, PTRS associated with a first DL transmission may be provided to the UE by DCI whereas a second DL power adjustment value $PA_2$ associated with a second DL transmission may be determined by the UE by RRC configuration, MAC CE signaling or from system specifications. PA value(s) provided to the UE by RRC signaling may be used in conjunction with MAC CE provided PA values (or index representations). A DL power adjustment value PA associated with the DL reception of PDSCH, PDCCH or DMRS, PTRS in a serving cell may be determined by the UE by means of providing an index value through DCI signaling and the UE selecting one or more entries from an RRC configurable table using the provided index value. The UE may determine a default value for the DL power adjustment value PA associated with PDSCH, PDCCH or DMRS, PTRS in a slot. A DL reference signal or power level may be configured, indicated or be given by reference for the UE with respect to which the assumed DL power adjustment of PDSCH, PDCCH or DMRS, PTRS in the serving cell is determined by the UE and/or the configurable DL power adjustment value PA and applied by the UE for reception of PDSCH, PDCCH or DMRS, PTRS. One or more DL reference signal(s) or power level(s) may be configured for the UE. A DL reference signal with respect to the DL power adjustment of PDSCH, PDCCH or DMRS, PTRS may be associated with or linked as TCI state(s) or RS resource index(es) corresponding to an SSB or to a CSI-RS resource index. A DL reference signal or power level may be configured for or indicated to the UE to determine parameters for UL transmission in the full-duplex slot.

In one embodiment, the UE is provided with a configurable DL power adjustment value PA allowing to determine an adjusted or assumed PDSCH, PDCCH or DMRS, PTRS transmission or reception power level on an SBFD slot/symbol with respect to a suitably chosen DL reference signal and power level. For example, the configurable DL power adjustment value PA is provided with respect to a PDSCH configured for the UE in one or more slots in which full-duplex operation using the same time-domain resource(s) is supported. Descriptions provided use the case of PDSCH in a slot configured for full-duplex operation, but the same considerations in the disclosure apply to the case of PDCCH or DMRS, PRTS by substituting the terms "PDSCH" with "PDCCH", "DMRS" or "PTRS".

The UE is configured with a PDSCH EPRE for the full-duplex slot. Different full-duplex slots may be configured with different PDSCH EPREs, or a same value for the PDSCH EPRE may be configured in multiple full-duplex slots. For PDSCH reception in a first or a second SBFD subband on a full-duplex slot/symbol, the UE may be provided with a first and a second PDSCH EPRE value(s), respectively. The first and the second PDSCH EPRE value(s) may be a same value or different values. A PDSCH EPRE value may be configured as relative offset value in dB with respect to the SS/PBCH block EPRE value. Or, a PDSCH EPRE may be configured as relative offset value in dB with respect to a NZP CSI-RS EPRE value (assuming that its value range is sufficiently increased when compared to Rel-15). Alternatively, a PDSCH EPRE value in a full duplex slot may be configured as absolute value in dBm. When expressed as relative or as absolute value, a PDSCH EPRE value may correspond to a maximum value or to a minimum value or to a range of values which the UE may assume for DL reception in a full-duplex slot or an SBFD subband.

A PDSCH EPRE value may be defined with respect to REs not used by DMRS or PTRS or NZP CSI-RS or with respect to REs not used by the PDSCH transmission, e.g., such as when RB level or RE level rate matching is configured. The UE decoding assumption for a PDSCH EPRE in a full-duplex slot or SBFD subband may be provided using a configured DMRS EPRE value as relative value or as absolute value or as value range and a PDSCH EPRE value is then fixed or within known bounds of the value(s) provided for the DMRS EPRE value. The PDSCH EPRE value may be provided for or be associated with a particular type of DL transmission from the gNB in the full-duplex slot, e.g., associated with a modulation order, a transmission scheme, a resource allocation scheme, a size, location, start, end of PDSCH frequency allocation(s), a number of symbols for the PDSCH time-domain allocation, a DMRS mapping type or a symbol allocation, a TCI state, an RS index, etc.

More than one PDSCH EPRE value may be configured or indicated for a same slot, e.g., full-duplex slot. A first and a second PDSCH EPRE may be configured for the PDSCH transmission, e.g., one for the first SBFD DL subband (in the upper part of carrier BW) and one for the second SBFD DL subband (in the lower part of carrier BW) of the full-duplex slot, or one PDSCH ERPE value may be configured or indicated for DL transmissions to a UE using an SBFD DL subband and one for DL transmissions to a UE using an SBFD UL subband of a full-duplex slot or symbol.

Figure 15:
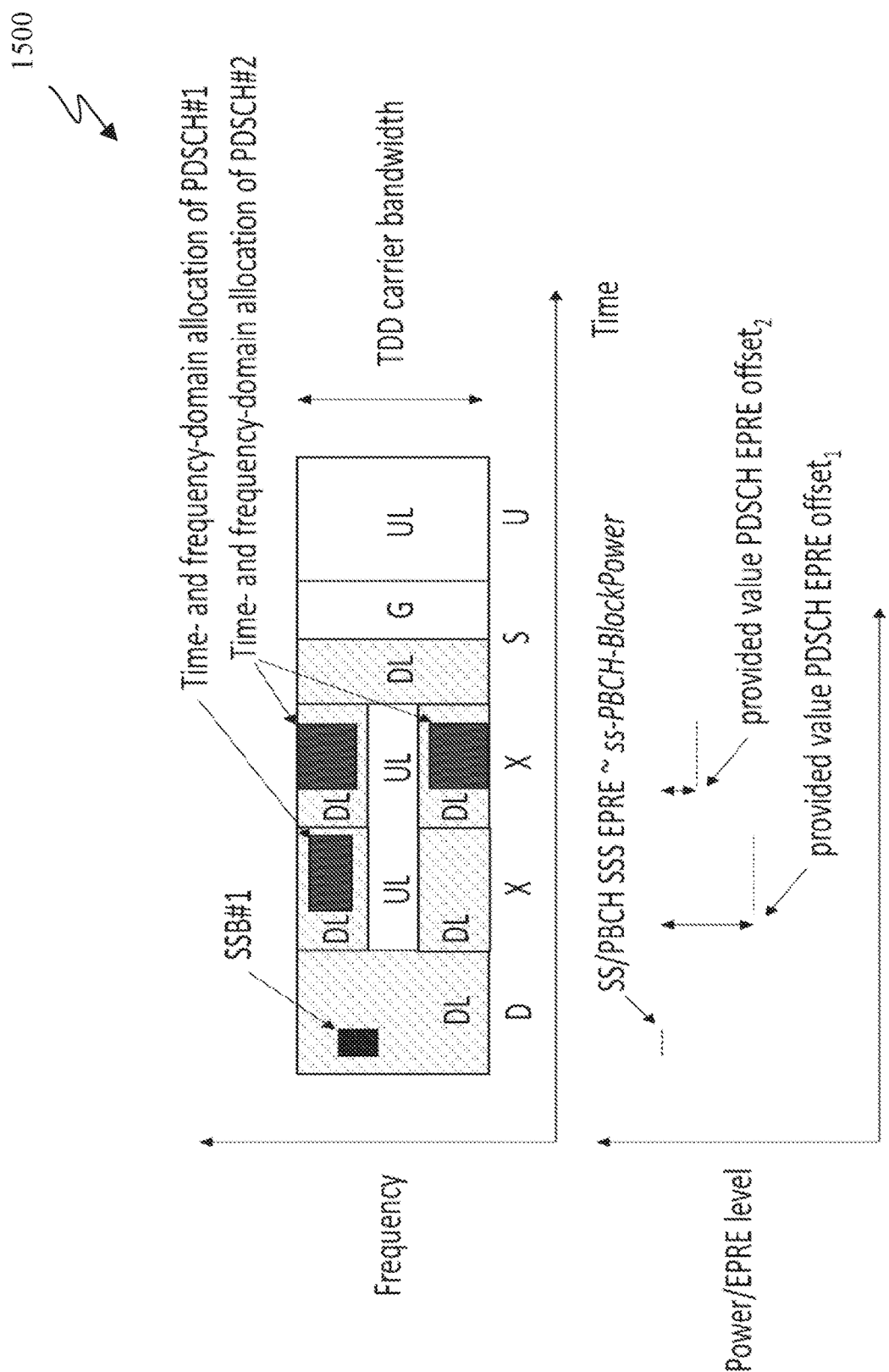
FIG. 15 illustrates an example use of the configurable DL power adjustment value for physical downlink shared channel (PDSCH) in a full-duplex communications system according to embodiments of the present disclosure.

FIG. 15 illustrates an example use of the configurable DL power adjustment value for PDSCH in a full-duplex communications system 1500 according to embodiments of the present disclosure. The embodiment of the example use of the configurable DL power adjustment value for PDSCH in a full-duplex communications system 1500 illustrated in FIG. 15 is for illustration only. FIG. 15 does not limit the scope of this disclosure to any particular implementation of the example use of the configurable DL power adjustment value for PDSCH in a full-duplex communications system 1500.

As shown in FIG. 15 for the example case of PDSCH, the UE determines a DL reference power level for reception in an SBFD slot/symbol or in an SBFD subband using a DL reference signal. For example, the UE may use SSB transmission(s) from the gNB in the Pt DL slot shown to determine the DL reference power for receptions in an SBFD slot/symbol or in an SBFD subband on a slot/symbol using the DL SS/PBCH SSS EPRE. Alternatively, a NZP CSI-RS resource in a slot may be configured for the UE for which the CSI-RS EPRE value is provided to the UE and then the DL reference power level for receptions in an SBFD slot/symbol or in an SBFD subband on a slot/symbol is determined by the UE using the CSI-RS resource. The configurable DL power adjustment value PA is applied by the UE for reception of the PDSCH with respect to the DL reference power level, e.g., using the DL SS/PBCH SSS EPRE (or the NZP CSI-RS EPRE). An SSB or CSI-RS index may be provided to the UE to determine the DL reference signal or reference power. The DL power adjustment value PA can be a positive or a negative value, e.g., the assumed or adjusted UE power adjustment of the PDSCH in a slot or symbol configured for full-duplex operation with respect to the DL reference power can be increased or decreased. When PA=0, the DL reference power of the DL reference signal may apply.

For PDCCH, DMRS or PTRS reception in a slot configured for full-duplex operation, similar considerations can be applied as shown by the example for the case of PDSCH in FIG. 15.

A value representative or associated with the DL power adjustment value PA for PDSCH, PDCCH or DMRS, PTRS reception in an SBFD slot/symbol or in an SBFD subband in a slot or symbol can be provided to the UE using either one or a combination of methods such as by DCI signaling, by RRC signaling, by MAC CE signaling, or a value can be tabulated and/or listed by system operating specifications. For example, the DL power adjustment value for a DL channel or signal of type PDSCH, PDCCH or DMRS, PTRS can be signaled in the DL scheduling DCI using M bits and the UE determines a DL power adjustment value PA from one of up to 2M values tabulated in system specifications using the DCI signaled index. In another example, the DL power adjustment value for PDSCH in an SBFD slot/symbol or in an SBFD subband in a slot or symbol, e.g., for a radio resource where full-duplex operation is supported can be configured by RRC parameter pdsch-TimeDomainAllocationList, e.g., a value representative of or associated with the DL power adjustment value PA is configured for a row in the TDRA table. The UE then uses the signaled index provided by the time-domain resource assignment field in the scheduling DCI to determine a DL power adjustment value PA for the actual transmissions from the RRC configured table. In another example, the DL power adjustment value for PDSCH can be configured by RRC parameter pdsch-Config, e.g., the value representative of or associated with the DL power adjustment value PA is configured for the possible time-domain resource allocations of the PDSCH.

A DL power adjustment value PA configured by the gNB for DL transmissions to the UE in an SBFD slot/symbol or in an SBFD subband in a slot or symbol, e.g., a radio resource configured for full-duplex operation can be used by the gNB to adjust or limit the transmission power of selected DL signals or channels. For example, and without loss of generality, PDCCH from the gNB in the first 1-3 symbols of the full-duplex slot is transmitted using the DL reference power, but PDSCH transmissions from the gNB to the UE in the subsequent symbols of slot i apply the DL power adjustment value.

When the UE is provided a DL power adjustment value PA for a PDSCH, PDCCH or DMRS, PTRS reception in an SBFD slot/symbol or in an SBFD subband in a slot or symbol, the UE may assume that for subcarrier spacing configuration $\mu$, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{subframe,\mu}-1\}$ in increasing order within a frame. There are $N_{symb}^{slot}$ consecutive OFDM symbols in a slot where $N_{symb}^{slot}$ depends on the cyclic prefix and is defined in REF1. The start of slot $n_s^\mu$ in a subframe is aligned in time with the start of OFDM symbol $n_s^\mu N_{symb}^{slot}$ in the same subframe for the DL reference signal determined by the UE. When the UE is provided a DL power adjustment value PA, the UE may assume that OFDM symbol $n_s^\mu N_{symb}^{slot}$ of the DL transmission starts according to the DL reference timing of the reference cell.

When the UE is provided a DL power adjustment value PA applied to a PDSCH, PDCCH or DMRS, PTRS in an SBFD slot/symbol or in an SBFD subband in a slot or symbol of the serving cell, the UE may assume that the ratio of PDSCH, PDCCH or DMRS, PTRS EPRE to SS/PBCH SSS EPRE corresponds to the provided value PA in the associated transmission resources. For example, for slots numbered from 0 to 4 in the UL-DL frame configuration shown in FIG. 15, if a DL power adjustment value $PA_1$ is provided as PDSCH EPRE offsets value to the UE for a PDSCH reception in slot 1, the UE adjusts the assumed DL power for the PDSCH transmission using symbols in slot 1 using the value $PA_1$ with respect to the DL reference power. The UE then applies the determined DL power adjustment to its receiver, e.g., AGC and demodulates and decodes the PDSCH on the scheduled transmission resources in the slot i. A later PDSCH transmission to the UE in slot 2 may use a different DL power adjustment value $PA_2$ is provided as PDSCH EPRE $offset_2$. Accordingly, the UE adjusts the assumed DL power adjustment for PDSCH in slot 2. The UE uses the DL power adjustment in slot 2 to determine its receiver processing settings, e.g., AGC, including the OFDM symbols scheduled for the PDSCH reception in that slot for purpose of demodulation and decoding the PDSCH on the scheduled transmission resources.

For example, if a UE is configured with two DL carriers, e.g., when configured with carrier aggregation or dual connectivity, a same DL power adjustment value PA may be applied to both DL carriers. For example, when the UE is configured with multiple DL BWPs for a serving cell and the UE is provided a DL power adjustment value PA for the active BWP of the serving cell, the UE determines the assumed DL power adjustment of the PDCCH, PDSCH or DMRS, PTRS in an SBFD slot/symbol or in an SBFD subband in a slot or symbol, e.g., a radio resource configured for full-duplex operation of the serving cell based on the value PA for the active DL BWP. A value for PA may be provided to the UE for a suitable transmission duration. Although for conciseness in the descriptive parts of the disclosure a slot is often used as exemplary time unit, instead of a value PA provided for a slot, a DL power adjustment value may be associated with a symbol time interval or a multiple thereof. A DL power adjustment value PA may be associated or defined with respect to a same or an adjustable or scalable step size and/or desired resolution. For example, a value for PA may be provided in units of dB (relative to a reference power level) or dBm (as absolute power level).

Using the configurable DL power adjustment value PA in an SBFD slot/symbol or in an SBFD subband in a slot or symbol to configure and provide to the UE the assumed power level of a PDSCH, PDCCH or DMRS, PTRS to a UE in a cell, the transmission power levels for a PDSCH, PDCCH or DMRS, PTRS for an SBFD slot/symbol or for an SBFD subband in a slot or symbol can be selected by the gNB without adversely impacting complexity or performance of the UE implementation.

In one example, the UE is configured with a PDSCH EPRE for the full-duplex slot or for an SBFD subband(s) as relative offset value in dB with respect to the SS/PBCH block EPRE or the CSI-RS EPRE. For a serving cell, the UE can be provided a set of TCI states or a set of RS resource indexes corresponding to a SS/PBCH block or to a CSI-RS resource index in a slot where a PDSCH EPRE adjustment is provided as described in REF6. The PDSCH EPRE can be derived from a DL CSI-RS EPRE as determined using REF4 and a PDSCH power offset provided by parameter powerControlOffsetPDSCH as described in REF6. For a DL DM-RS and/or PT-RS associated with the PDSCH, the UE may assume that the ratio of PDSCH EPRE to DM-RS EPRE, and/or PT-RS EPRE to PDSCH EPRE, is obtained as described in REF4. If no TCI state or RS resource index is provided to the UE, the UE may assume that a same PDSCH EPRE adjustment applies to all TCI states or RS resource indexes configured for the UE. A PDSCH EPRE adjustment provided by powerControlOffsetPDSCH may be restricted to transmission resources that result in simultaneous reception using the same time-domain resources by the gNB in a slot. Note that when the CSI-RS EPRE is used, its offset range may be increased when compared to Rel-15 NR, e.g., using a range from the set {−15, −12, −9, −6, −3, 0, +3, +6} dB.

In another example, the UE is configured with a PDSCH EPRE for the full-duplex slot or for an SBFD subband in a slot or symbol as absolute power value in dBm. For a serving cell, the UE can be provided a set of TCI states or a set of RS resource indexes corresponding to a SS/PBCH block or to a CSI-RS resource index in a slot where a PDSCH EPRE transmit power is provided by higher layers. The UE may assume that constant EPRE is used for all REs of the PDSCH resource allocation in the symbols of the full-duplex slot or SBFD subband. For a DL DM-RS and/or PT-RS associated with the PDSCH, the UE may assume that the ratio of PDSCH EPRE to DM-RS EPRE, and/or PT-RS EPRE to PDSCH EPRE, is obtained as described in REF4. If no TCI state or RS resource index is provided to the UE, the UE may assume that a same PDSCH EPRE transmit power applies to all TCI states or RS resource indexes configured for the UE. A PDSCH EPRE transmit power provided by higher layers may be restricted to transmission resources that result in simultaneous reception using the same time-domain resources by the gNB in a slot.

Figure 16:
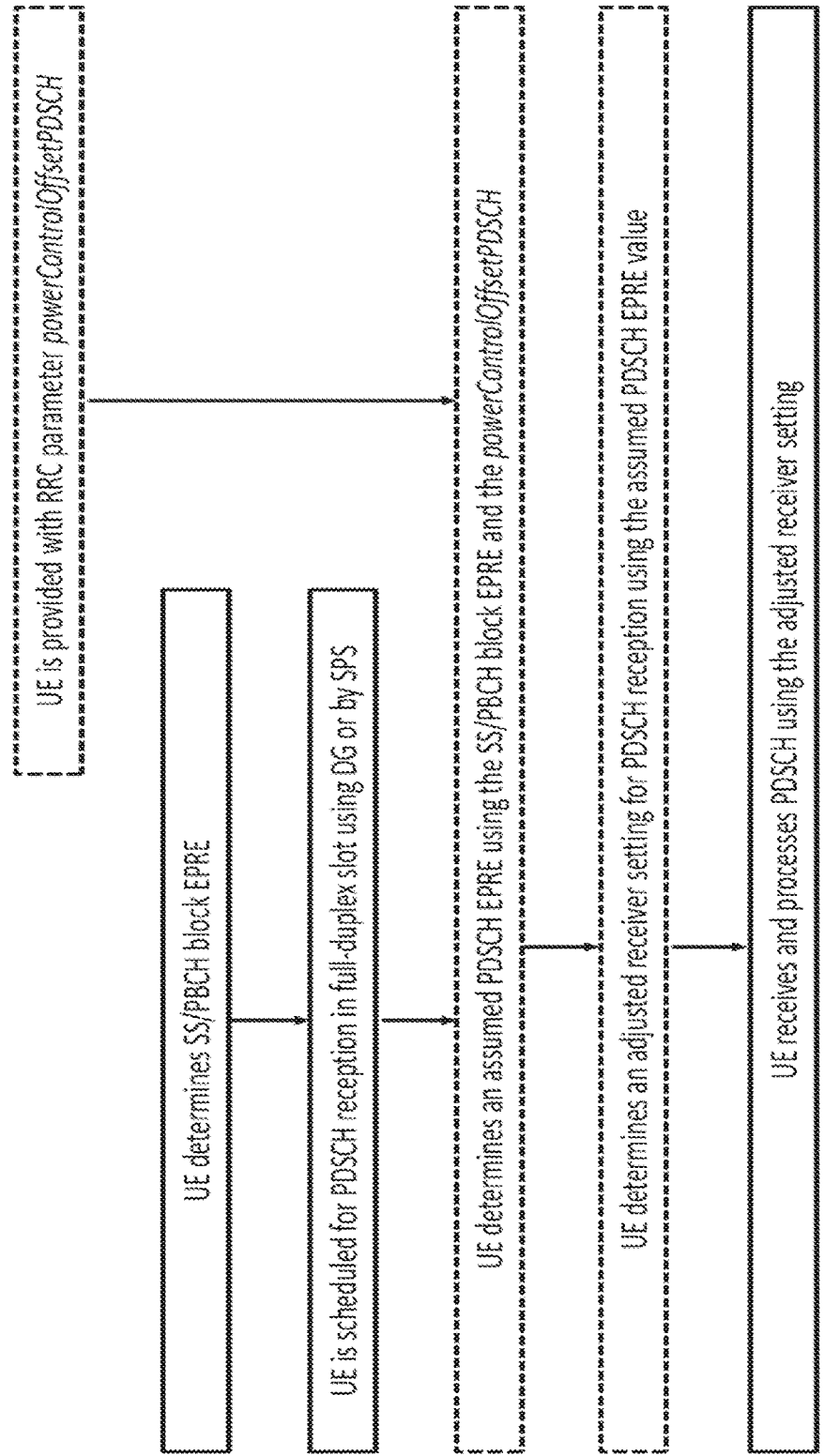
FIG. 16 illustrates an example method performed by a UE for using the configured DL power adjustment value for PDSCH reception in a full-duplex system according to embodiments of the disclosure.

FIG. 16 illustrates an example method 1600 performed by a UE for using the configured DL power adjustment value for PDSCH reception in a full-duplex system according to embodiments of the disclosure. The embodiment of the example method 1600 performed by a UE for using the configured DL power adjustment value for PDSCH reception in a full-duplex system illustrated in FIG. 16 is for illustration only. FIG. 16 does not limit the scope of this disclosure to any particular implementation of the example method 1600 performed by a UE for using the configured DL power adjustment value for PDSCH reception in a full-duplex system.

As illustrated in FIG. 16, a UE (such as the UE 116) determines the power level for a DL transmission of PDSCH from the gNB in slot i. The UE determines the DL reference power level using a selected SS/PBCH index of the serving cell. The UE has been provided by RRC with the PDSCH EPRE for the full-duplex slot as relative offset value in dB with respect to the SS/PBCH block EPRE. The UE receives a DCI scheduling the PDSCH in the full-duplex slot. The UE determines the assumed PDSCH EPRE value of the PDSCH transmission from the SS/PBCH block EPRE and the configured powerControlOffsetPDSCH value. The UE determines an adjusted receiver setting for PDSCH using the assumed PDSCH EPRE value in the full-duplex slot. The UE adjusts its receiver processing to the adjusted receiver setting determined in the previous step. The UE receives the PDSCH transmission in the symbols allocated to PDSCH transmission in the full-duplex slot using the adjusted receiver setting.

In one embodiment, a value associated with the DL power adjustment value PA allowing to determine the adjusted or assumed PDSCH, PDCCH or DMRS, PTRS, CSI-RS transmission or reception power level in an SBFD slot/symbol or in an SBFD subband in a slot or symbol may be provided to the UE by L1 control signaling such as a DCI, by MAC CE or by RRC. Descriptions provided use the case of PDSCH in a slot configured for full-duplex operation, but the same considerations in the disclosure may be applied to the case of PDCCH or DMRS, PRTS, CSI-RS by substituting the terms "PDSCH" with "PDCCH", "DMRS", "PTRS" or "CSI-RS".

The gNB can configure an EPRE value or value range for the PDSCH, PDCCH, DMRS, PTRS or CSI-RS for SBFD slot(s) or symbol(s) or for SBFD subband(s) in the TDD cell supporting full-duplex operation using RRC signaling, MAC CE or DCI signaling. The UE may be provided with a minimum or a maximum EPRE value or an EPRE value range for the PDSCH, PDCCH, DMRS, PTRS or the CSI-RS. The MAC CE or DCI signaling may indicate to the UE an EPRE value or range by indexing into an RRC configured set of possible EPRE values or ranges.

In one example, a value associated with the DL power adjustment PA determine an adjusted or assumed PDSCH, PDCCH or DMRS, PTRS, CSI-RS transmission or reception power level for a full-duplex slot or symbol or for an SBFD subband in a slot or symbol may be provided to the UE by higher layers, e.g., configured by RRC signaling. For the case of PDSCH, the UE may be provided a higher layer parameter powerControlOffsetPDSCH by RRC signaling and configuration. The parameter may be included in one or more signaling messages and/or IEs. For example, and without loss of generality, the parameter powerControlOffsetPDSCH may be signaled from the gNB to the UE as part of RRC signaling messages of type RRCSetup, RRCReconfiguration, SIB1 or SystemInformation and may be included in RRC IEs of type ServingCellConfig, ServingCellConfigCommon, ServingCellConfigSIB1 or PDSCH-Config where an RRC configuration parameter may be of enumerated, listed or sequence type and/or may be encoded as a bit string. Similar considerations apply to the cases of PDCCH or DMRS, PTRS, CSI-RS.

In another example, the value for the DL power adjustment PA is provided to the UE in a new information field "PDSCH power offset" of size M bits in a DCI scheduling the PDSCH. A motivation is that the gNB scheduler can set and signal to the UE the value of the applicable DL power adjustment for the PDSCH transmission in the full-duplex slot or in an SBFD subband when computing the resulting PDSCH EPRE allocation applied by the gNB at run time, e.g., when scheduling the DL and UL transmissions in a slot for a selected set of UE DL-UL pairings. Upon reception of the DCI in the PDCCH, the UE can adjust its receiver processing accordingly, e.g., update AGC setting for PDSCH transmission received in subsequent symbol(s).

TABLE 1 shows an example for the PDSCH power offset field using M=2 bits where the index j refers to the indicated relative PDSCH EPRE offset value in the slot. When the PDSCH power offset field signals a value 00, no DL power adjustment value PA is assumed by the UE with respect to the SS/PBCH block EPRE, e.g., the UE may assume that PDSCH transmission from the gNB uses the DL reference power. Value 01 signals a DL power adjustment value PA of −3 dB. The UE may assume that PDSCH DL transmission is offset, e.g., reduced by 3 dB when compared to the DL reference power, etc. The signaled relative PDSCH EPRE offset value may be provided for or be associated with a particular type of DL transmission in the full-duplex slot or in an SBFD subband, e.g., a modulation order, a transmission scheme, a resource allocation scheme, a size, location, start, end of a PDSCH frequency allocation, a number of symbols for the PDSCH time-domain allocation, a DMRS mapping type or symbol allocation, a TCI state, an RS index, etc.

TABLE 1

Example of new index and field values for "PDSCH power offset" when scheduling PDSCH in the full-duplex communication system.

| Value | PDSCH power offset |
|---|---|
| 00 | 0 dB |
| 01 | −3 dB |
| 10 | −6 dB |
| 11 | −12 dB |

As can be seen, a suitable range and resolution for the signaled PDSCH power offset in the full-duplex slot or SBFD subband can be chosen without departing from the scope of the present disclosure. The range can comprise both positive and negative receive DL power adjustment values for the purpose of increasing or decreasing the indicated PDSCH power offset which the UE may assume in an SBFD slot/symbol or in an SBFD subband in a slot or symbol. The resolution or the range does not need to be uniform. A motivation is to allow for covering the needed range of DL power adjustments when adjusting the power difference of the victim UE with higher resolution in a value range with higher likelihood for observed interference scenarios experienced during system operation. Furthermore, the PDSCH power offset in the example can be expressed with respect to any suitable chosen time unit, e.g., for a slot, scheduling interval or one or more symbols. Instead of a new information field in a DCI scheduling the PDSCH, an existing field can be reused to provide an indication of the power adjustment value to the UE. In another example, an indication for the PDSCH power adjustment to determine the DL power adjustment value PA for one or more DL signal(s)/channel(s) may be transmitted through a group DCI instead of a DL assignment DCI scheduling PDSCH reception. Reception using DL SPS can follow similar principles as described for the case of dynamic grants. For example, (de-)activation DCIs may be used to provide the value of the indicated PDSCH power offset, or such value(s) may be configured by RRC in the SPS configuration provided by higher layers.

Figure 17:
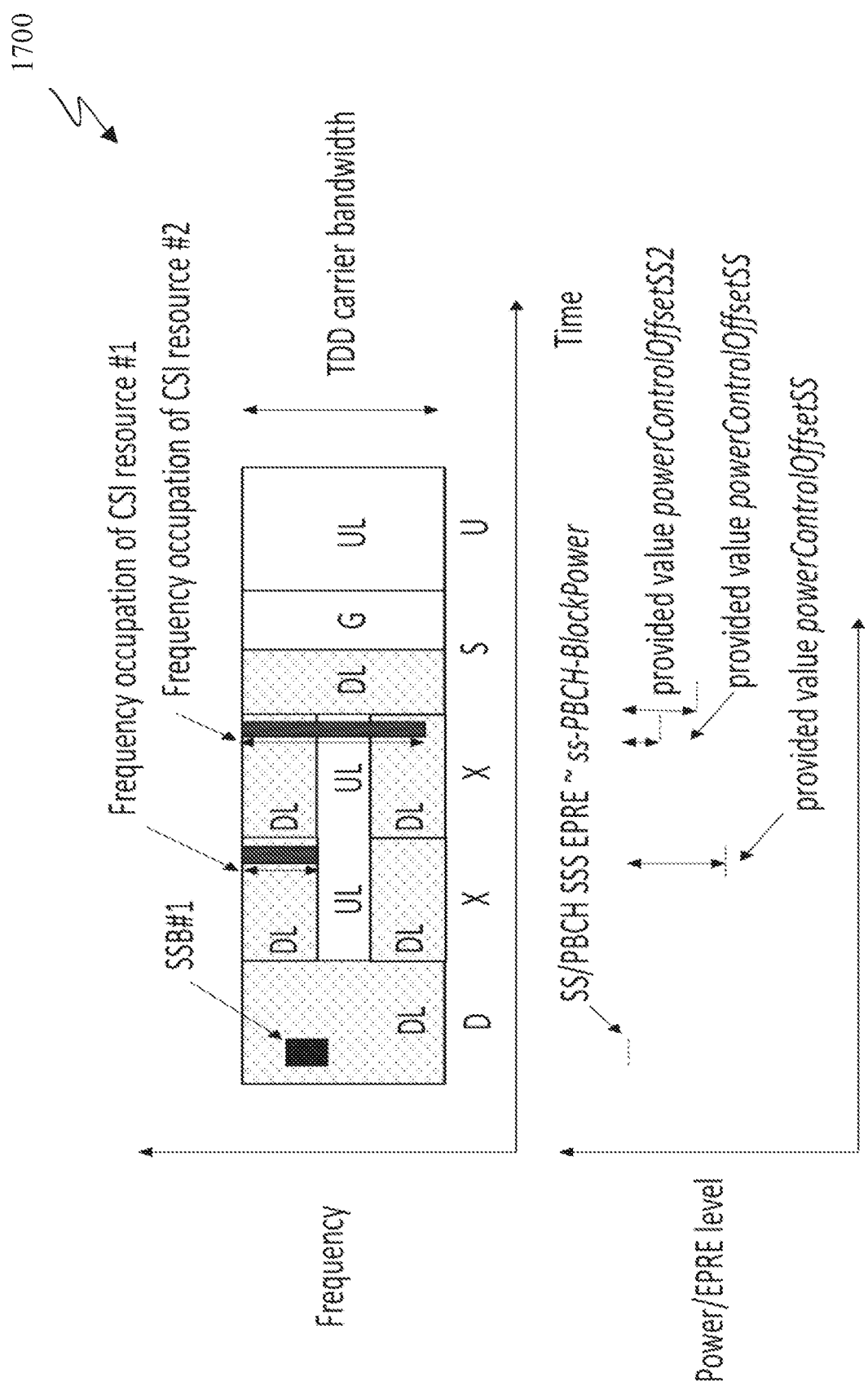
FIG. 17 illustrates an example method performed by a UE for using a downlink control information (DCI)-signaled DL power adjustment value in a full-duplex system according to embodiments of the disclosure.

FIG. 17 illustrates an example method 1700 performed by a UE for using a DCI-signaled DL power adjustment value in a full-duplex system according to embodiments of the disclosure. The embodiment of the example method 1700 performed by a UE for using a DCI-signaled DL power adjustment value in a full-duplex system illustrated in FIG. 17 is for illustration only. FIG. 17 does not limit the scope of this disclosure to any particular implementation of the example method 1700 performed by a UE for using a DCI-signaled DL power adjustment value in a full-duplex system.

As illustrated in FIG. 17, a UE (such as the UE 116) determines the power level for a DL transmission of PDSCH from the gNB in slot i. The UE determines the DL reference power level using a selected SS/PBCH index of the serving cell. The UE is configured by RRC for DCI reception including the field 'PDSCH power offset' for scheduling the PDSCH. The UE receives a DCI scheduling the PDSCH in the full-duplex slot. The UE determines the assumed PDSCH EPRE value of the PDSCH transmission from the SS/PBCH block EPRE and the value indicated by the field PDSCH power offset in the scheduling DCI. The UE determines an adjusted receiver setting for PDSCH using the assumed PDSCH EPRE value in the full-duplex slot. The UE adjusts its receiver processing to the adjusted receiver setting determined in the previous step. The UE receives the PDSCH transmission in the symbols allocated to PDSCH transmission in the full-duplex slot using the adjusted receiver setting.

In one embodiment, the UE is provided with a configurable relative DL power adjustment value PA allowing to determine an adjusted or assumed ratio of PDCCH to PDSCH for PDSCH reception in an SBFD slot/symbol or in an SBFD subband(s) in a slot or symbol. For example, the configurable relative DL power adjustment value PA for PDSCH reception by the UE is provided to the UE with respect to a PDCCH for one or more SBFD slots or for an SBFD subband in a slot or symbol in which a PDSCH may be received. A minimum, maximum or range of delta EPRE(s) of a PDCCH with respect to the PDSCH (or conversely) may be configured in the normal DL slot or the full-duplex slot.

In one example, the UE is configured with a PDSCH EPRE for the full-duplex slot or for an SBFD subband in a slot or symbol as relative offset value in dB with respect to the PDCCH EPRE, e.g., with respect to the DMRS configured for PDCCH reception in the CORESET and the Search Space (Set). For a serving cell, the UE can be provided a set of TCI states or a set of RS resource indexes in a slot where a PDSCH EPRE adjustment is provided as described in REF6. The PDSCH EPRE can be derived from a PDCCH EPRE as determined using REF3 and a PDSCH power offset provided by parameter powerControlOffsetPDSCH as described in REF6. For a DL DM-RS and/or PT-RS associated with the PDSCH, the UE may assume that the ratio of PDSCH EPRE to DM-RS EPRE, and/or PT-RS EPRE to PDSCH EPRE, is obtained as described in REF4. If no TCI state or RS resource index is provided to the UE, the UE may assume that a same PDSCH EPRE adjustment applies to all TCI states or RS resource indexes configured for the UE. A PDSCH EPRE adjustment provided by powerControlOffsetPDSCH may be restricted to transmission resources that result in simultaneous reception using the same time-domain resources by the gNB in a slot.

Figure 18:
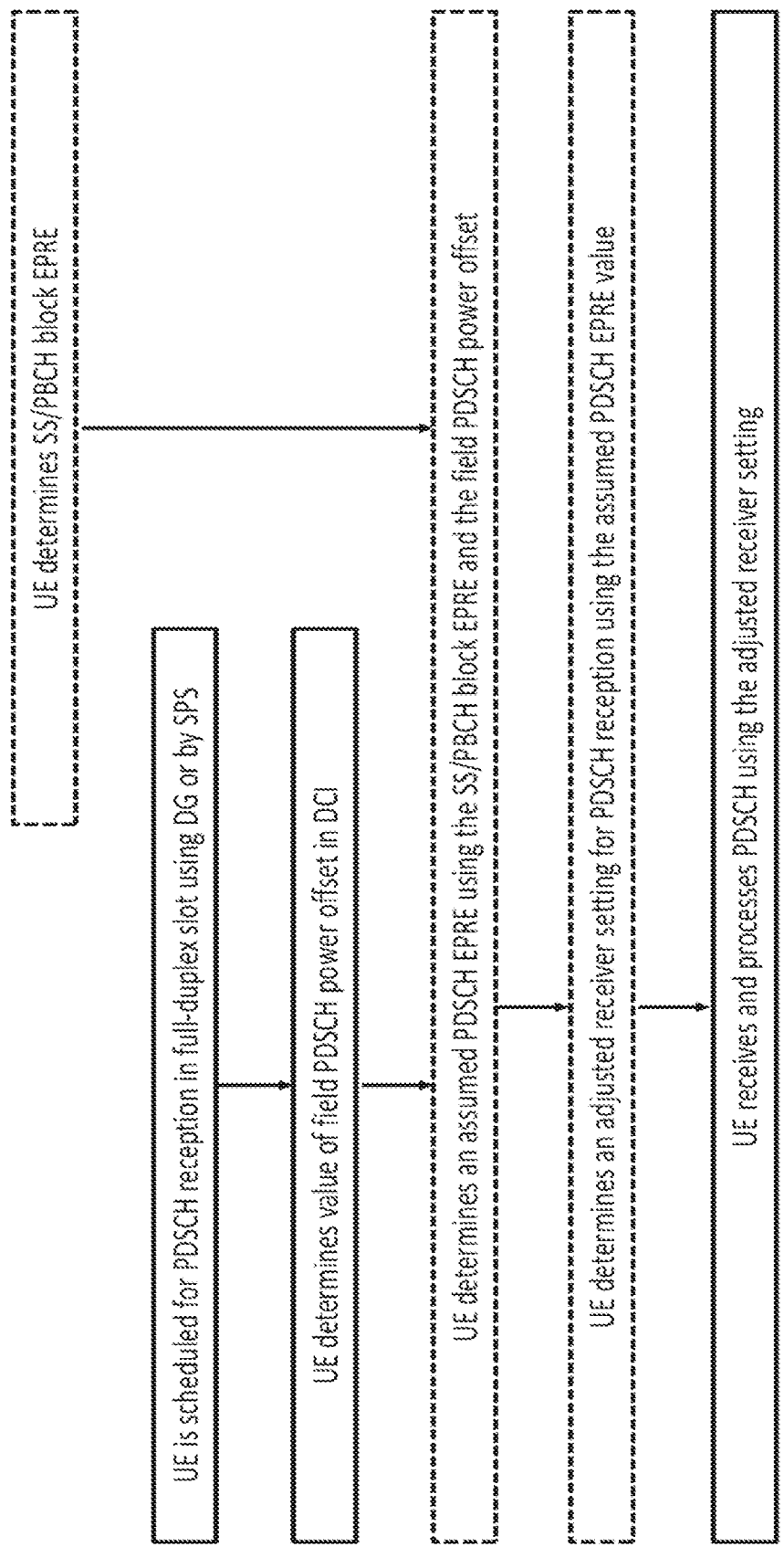
FIG. 18 illustrates an example of multiple CSI reference signal (CSI-RS) power adjustment values per CSI resource in a full-duplex communications system according to embodiments of the present disclosure.

FIG. 18 illustrates an example of multiple CSI-RS power adjustment values per CSI resource in a full-duplex communications system 1800 according to embodiments of the present disclosure. The embodiment of the example of multiple CSI-RS power adjustment values per CSI resource in a full-duplex communications system 1800 illustrated in FIG. 18 is for illustration only. FIG. 18 does not limit the scope of this disclosure to any particular implementation of the example of multiple CSI-RS power adjustment values per CSI resource in a full-duplex communications system 1800.

In one embodiment, the UE is provided with a first and a second CSI-RS EPRE value for a same CSI resource or for a same CSI-RS resource set in the full-duplex slot, e.g., the first and a second CSI-RS EPRE value may be configured or indicated for the first SBFD DL subband (in the upper part of carrier BW) and for the second SBFD DL subband (in the lower part of carrier BW) of the full-duplex slot(s) or symbol(s), respectively. Or the first CSI-RS EPRE value is configured or indicated for CSI reporting by the UE for the NZP CSI-RS in an SBFD DL subband and a second CSI-RS EPRE value is configured or indicated to derive the CSI report using NZP CSI-RS configured and/or activated in the SBFD UL subband of the full-duplex slot(s) or symbol(s).

As shown in FIG. 18, the UE determines a DL reference power level using a DL reference signal. For example, the UE can use SSB transmission(s) from the gNB in the Pt DL slot shown to determine the DL reference power, e.g., the DL SS/PBCH SSS EPRE. In the $2^{nd}$ slot, e.g., configured for full-duplex operation, CSI resource #1 is configured with a frequency occupancy limited to the first (upper part of carrier BW) SBFD DL subband in the slot. The NZP CSI-RS resource in the slot is configured using a single CSI-RS EPRE value provided by powerControlOffsetSS. In the $3^{rd}$ slot, e.g., configured for full-duplex operation, CSI resource #2 is configured with a frequency occupancy comprising parts of the first (upper part of carrier BW) SBFD DL subband in the slot and the second (lower part of carrier BW) SBFD DL subband in the slot, e.g., containing the UL subband. For the channel occupancy of the NZP CSI-RS resource in the slot, the UE is provided with a first and a second CSI-RS EPRE value provided by parameters powerControlOffsetSS and powerControlOffsetSS2. The UE determines an assumed CSI RS EPRE value for the first SBFD DL subband with respect to the SS/PBCH SSS EPRE using the first provided CSI-RS EPRE value from powerControlOffsetSS, and the UE determines an assumed CSI RS EPRE value for the second SBFD DL subband with respect to the SS/PBCH SSS EPRE using the second provided CSI-RS EPRE value from powerControlOffsetSS2.

In one example, the UE is configured with a first and a second CSI-RS EPRE adjustment value for the full-duplex slot or symbol with respect to the SS/PBCH block EPRE. For a serving cell, the UE can be provided a set of TCI states corresponding to a SS/PBCH block where a CSI-RS EPRE adjustment is provided as described in REF6. The UE may be provided with parameter powerControlOffsetSS and parameter powerControlOffsetSS2 when configured. The UE may compute an assumed ratio of NZP CSI-RS EPRE for purpose of deriving and reporting the CSI feedback using the provided parameter powerControlOffsetSS for RBs in the configured CSI frequency occupancy larger than the highest RB indicated by the provided xdd-config and using the provided parameter powerControlOffsetSS2 for RBs in the configured CSI frequency occupancy smaller than the smallest RB indicated by the provided xdd-config. If no TCI state is provided to the UE, the UE may assume that a same CSI-RS EPRE adjustment applies to all TCI states configured for the UE. A CSI-RS EPRE adjustment provided by powerControlOffsetSS or powerControlOffsetSS2 may be restricted to transmission resources that result in simultaneous reception using the same time-domain resources by the gNB in a slot.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE), the method comprising:
   receiving, from a base station, a first set of parameters for a first downlink (DL) channel associated with a non-subband full duplex (non-SBFD) slot;
   receiving, from the base station, a second set of parameters for a second DL channel associated with a subband full duplex (SBFD) slot;
   identifying, based on the SBFD slot for a reception, a first power adjustment value associated with a first subband of the SBFD slot and a second power adjustment value associated with a second subband of the SBFD slot from the second set of parameters;
   receiving, based on the first power adjustment value, a signal on the second DL channel in the first subband in the SBFD slot; and
   receiving, based on the second power adjustment value, the signal on the second DL channel in the second subband in the SBFD slot.

2. The method of claim 1, wherein:
   the first power adjustment value and the second power adjustment value are associated with an energy-per-resource element (EPRE) offset value to a synchronization signal (SS)/physical broadcast channel (PBCH) block power,
   the first power adjustment value and the second power adjustment value are associated with a demodulation reference signal (DMRS) resource element (RE) power or a data RE power of a physical downlink shared channel (PDSCH) reception, or
   the first power adjustment value and the second power adjustment value are associated with a channel state information (CSI) reference signal (RS) RE power.

3. The method of claim 1, further comprising:
   receiving a configuration for a DL reference signal including a reference signal power value;
   identifying, based on the first power adjustment value and the reference signal power value, a reception power for the second DL channel in the first subband in the SBFD slot; and
   identifying, based on the second power adjustment value and the reference signal power value, the reception power for the second DL channel in the second subband in the SBFD slot.

4. The method of claim 1, further comprising:
   identifying, based on a type of symbol in which the signal is to be received, the first power adjustment value and the second power adjustment value from the second set of parameters,
   wherein the symbol type is one of a DL symbol, a flexible symbol, or an uplink (UL) symbol.

5. A user equipment (UE), comprising:
   a transceiver configured to:
     receive, from a base station, a first set of parameters for a first downlink (DL) channel associated with a non-subband full duplex (SBFD) slot; and
     receive, from the base station, a second set of parameters for a second DL channel associated with a subband full duplex (SBFD) slot; and
   a processor operably coupled to the transceiver, the processor configured to identify, based on the SBFD slot for a reception, a first power adjustment value associated with a first subband of the SBFD slot and a second power adjustment value associated with a second subband of the SBFD slot from the second set of parameters,
   wherein the transceiver is further configured to:
     receive, based on the first power adjustment value, a signal on the second DL channel in the first subband in the SBFD slot; and
     receive, based on the second power adjustment value, the signal on the second DL channel in the second subband in the SBFD slot.

6. The UE of claim 5, wherein:
   the first power adjustment value and the second power adjustment value are associated with an energy-per-resource element (EPRE) offset value to a synchronization signal (SS)/physical broadcast channel (PBCH) block power,
   the first power adjustment value and the second power adjustment value are associated with a demodulation reference signal (DMRS) resource element (RE) power or a data RE power of a physical downlink shared channel (PDSCH) reception, or
   the first power adjustment value and the second power adjustment value are associated with a channel state information (CSI) reference signal (RS) RE power.

7. The UE of claim 5, wherein:
   the transceiver is further configured to receive a configuration for a DL reference signal including a reference signal power value, and
   the processor is further configured to:
     identify, based on the first power adjustment value and the reference signal power value, a reception power for the second DL channel in the first subband in the SBFD slot, and
     identify, based on the second power adjustment value and the reference signal power value, the reception power for the second DL channel in the second subband in the SBFD slot.

8. The UE of claim 5, wherein:
   the processor is further configured to identify, based on a type of symbol in which the signal is to be received, the first power adjustment value and the second power adjustment value from the second set of parameters, and
   the symbol type is one of a DL symbol, a flexible symbol, or an uplink (UL) symbol.

9. A base station (BS), comprising:
   a transceiver configured to:
     transmit, to a user equipment (UE), a first set of parameters for a first downlink (DL) channel associated with a non-subband full duplex (non-SBFD) slot; and
     transmit, to the UE, a second set of parameters for a second DL channel associated with a subband full duplex (SBFD) slot; and
   a processor operably coupled to the transceiver, the processor configured to
   identify, based on the SBFD slot for a transmission, a first power adjustment value associated with a first subband of the SBFD slot and a second power adjustment value associated with a second subband of the SBFD slot from the second set of parameters,
   wherein the transceiver is further configured to:
     transmit, based on the first power adjustment value, a signal on the second DL channel in the first subband in the SBFD slot; and transmit, based on the second power adjustment value, the signal on the second DL channel in the second subband in the SBFD slot.

10. The BS of claim 9, wherein:
the first power adjustment value and the second power adjustment value are associated with an energy-per-resource element (EPRE) offset value to a synchronization signal (SS)/physical broadcast channel (PBCH) block power,
the first power adjustment value and the second power adjustment value are associated with a demodulation reference signal (DMRS) resource element (RE) power or a data RE power of a physical downlink shared channel (PDSCH) reception, or
the first power adjustment value and the second power adjustment value are associated with a channel state information (CSI) reference signal (RS) RE power.

11. The BS of claim 9, wherein:
the first power adjustment value and the second power adjustment value are indicated, based on a type of symbol in which the signal is to be transmitted, from the second set of parameters, and
the symbol type is one of a DL symbol, a flexible symbol, or an uplink (UL) symbol.

* * * * *